(12) United States Patent
Byrne et al.

(10) Patent No.: US 9,278,867 B2
(45) Date of Patent: Mar. 8, 2016

(54) TRANSITION METAL COMPOUND PARTICLES AND METHODS OF PRODUCTION

(75) Inventors: Trevor Byrne, Sydney (CA); Madhav Prasad Dahal, Toronto (CA)

(73) Assignee: YAVA TECHNOLOGIES INC., Toronto (CA)

( * ) Notice: Subject to any disclaimer, the term of this patent is extended or adjusted under 35 U.S.C. 154(b) by 0 days.

(21) Appl. No.: 13/976,623

(22) PCT Filed: Dec. 16, 2011

(86) PCT No.: PCT/CA2011/050780
§ 371 (c)(1),
(2), (4) Date: Jun. 27, 2013

(87) PCT Pub. No.: WO2012/088604
PCT Pub. Date: Jul. 5, 2012

(65) Prior Publication Data
US 2013/0272949 A1    Oct. 17, 2013

Related U.S. Application Data

(60) Provisional application No. 61/428,284, filed on Dec. 30, 2010, provisional application No. 61/542,974, filed on Oct. 4, 2011.

(51) Int. Cl.
*C01B 31/24* (2006.01)
*C01G 45/00* (2006.01)

(52) U.S. Cl.
CPC .............. *C01G 45/006* (2013.01); *C01B 31/24* (2013.01); *C01P 2004/32* (2013.01); *C01P 2004/61* (2013.01)

(58) Field of Classification Search
CPC ... C01B 31/24; C01G 45/006; C01P 2004/32; C01P 2004/61

USPC ......... 423/419.1, 430, 304, 629, 641, 594.14, 423/622, 624, 618, 604, 605; 205/157.42
See application file for complete search history.

(56) References Cited

U.S. PATENT DOCUMENTS 5,788,943 A * 8/1998 Aladjov .................. 423/594.19
5,905,003 A * 5/1999 Young et al. ................. 429/223
(Continued)

FOREIGN PATENT DOCUMENTS

CA         2453555 A1    3/2003
WO       00/38811 A1    7/2000
(Continued)

OTHER PUBLICATIONS

Pohl, B., et al. "Charakterisierung einer konischen Geometrie für einen Ultraschalldurchflussreaktor". Chemie Ingenieur Technik vol. 81, Issue 10, pp. 1613-1622, Oct. 2009.*
(Continued)

*Primary Examiner* — Richard M Rump
(74) *Attorney, Agent, or Firm* — Borden Ladner Gervais LLP; David Nauman

(57) ABSTRACT

A method of preparing insoluble transition metal compound particles is described, comprising: providing a transition metal salt solution having the formula (TM)(S) wherein TM is one or more of Mn, Ni, Co, Mg, Zn, Ca, Sr, Cu, Zr, P, Fe, Al, Ga, In, Cr Ge or Sn; providing a source of a carbonate-, hydroxide-, phosphate-, oxyhydroxide- or oxide-based anionic compound wherein the anionic component, represented by S', is reactive with TM to form the particles; adding the transition metal salt solution and anionic compound to a reaction chamber; and subjecting the chamber to sonication at an intensity of about 0.1 to about 50 W/mL. In an exemplary embodiment, $MnCO_3$ particles are formed from: $MnSO_4$; and $Na_2CO_3$ and/or $NH_4HCO_3$, wherein the ratio of $MnSO_4$ to $Na_2CO_3$ and/or $NH_4HCO_3$ is from about 1:1.5 to 1.5:1. The particles may have narrow size distribution and a tap density of about 1.7-2.3 g/mL.

34 Claims, 18 Drawing Sheets

(56) References Cited

U.S. PATENT DOCUMENTS

| | | | |
|---|---|---|---|
| 6,576,205 B2* | 6/2003 | Babjak et al. | 423/142 |
| 2010/0018853 A1 | 1/2010 | Robinson et al. | |
| 2011/0180748 A1* | 7/2011 | Jahn | C01G 53/006 252/182.1 |

FOREIGN PATENT DOCUMENTS

| | | |
|---|---|---|
| WO | 02/089942 A1 | 11/2002 |
| WO | 03/002644 A1 | 3/2003 |
| WO | 2006/109940 A1 | 10/2006 |
| WO | WO 2010054304 A2 * | 5/2010 |

OTHER PUBLICATIONS

Machine translation of relevant portion of "Charakterisierung einer konischen Geometrie für einen Ultraschalldurchflussreaktor".*

Pohl, B., Brenner, G., et al. "Optimierung von Fällungsreaktionen im kontinuierlichen Ultraschallreaktor" Chemie Ingenieur Technik Special Issue: ProcessNet—Jahrestagung und 27. Jahrestagung der Biotechnologen vol. 81, Issue 8, p. 1165, Aug. 2009.*

Machine translation of relevant portion of "Optimierung von Fällungsreaktionen im kontinuierlichen Ultraschallreaktor".*

I Nishida, Precipitation of calcium carbonate by ultrasonic irradiation, Ultrasonics Sonochemistry, vol. 11, Issue 6, Sep. 2004, pp. 423-428, ISSN 1350-4177, http://dx.doi.org/10.1016/j.ultsonch.2003.09.003. (http://www.sciencedirect.com/science/article/pii/S1350417703001779).*

Ting-Feng Yi, Xin-Guo Hu, Preparation and characterization of submicro $LiNi0.5-xMn1.5+xO4$ for 5 V cathode materials synthesized by an ultrasonic-assisted co-precipitation method, Journal of Power Sources, vol. 167, Issue 1, May 1, 2007, pp. 185-191, ISSN 0378-7753, http://dx.doi.org/10.1016/j.jpowsour.2007.02.003.*

Huang Jian-feng, Zeng Xie-rong, Cao Li-yun, Xiong Xin-bo, Preparation of $Y2BaCuO5$ nanoparticles by a co-precipitation process with the aid of ultrasonic irradiation, Journal of Materials Processing Technology, vol. 209, Issue 6, Mar. 19, 2009, pp. 2963-2966, ISSN 0924-0136, http://dx.doi.org/10.1016/j.jmatprotec.2008.07.001.*

Human english translation of "Preparation and Shape Controlling of Submicron Manganese Carbonate".*

Lu, Chunling et al, "Preparation and Shape Controlling of Submicron Manganese Carbonate" Journal of the Chinese Ceramic Society, Mar. 2007, vol. 35, No. 3, 377-380.

Ruecroft, G et al "Sonocrystallization: The Use of Ultrasound for Improved Industrial Crystallization", Organic Process Research & Development, 2005, vol. 9, 923-932.

Shen, Peizhi et al, "Synthesis and electrochemical performance of $LiCrxMn2-xO4(x=0,0.02,0.05,0.08,0.10)$ powders by ultrasonic coprecipitation", J. Solid State Electrochem, 2006, 10:929-933.

Tingfeng Yi et al, "Synthesis and physicochemical properties of $LiAl0.05Mn1.95O4$ cathode material by the ultrasonicassisted sol-gel method" Journal of Power Sources 162, 2006, 636-643.

Park, S.H et al, "Electrochemical properties of layered $Li[Ni1/2Mn1/2]O2$ cathode material synthesised by ultrasonic spray pyrolysis", Journal of Applied Electrochemistry, 2003, 33: 1169-1173.

S.H. Park et al, "Synthesis and structural characterization of layered $Li[Ni1/3Co1/3Mn1/3]O2$ cathode materials by ultrasonic spray pyrolysis method" Electrochimica Acta 49, 2004, 557-563.

Andrew Van Bommel et al, "Synthesis of Spherical and Dense Particles of the Pure Hydroxide Phase $Ni1/3Mn1/3Co1/3(OH)2$", Journal of the Electrochemical Society, 2009, 156(5) A362-A365.

Huang J.F. et al, "Synthesis of $Y2BaCuO5$ Nanopowder by Co-precipitation Under Ultrasonic Irradiation" Key Engineering Materials, 2008, 635-637.

Oubani, H et al, "Effects of operating conditions on particle size in sonocrystallization", Asia-Pacific Journal of Chemical Engineering, 2010, vol. 5, 599-608.

Monnier, H et al, "Effects of ultrasound on micromixing in flow cell" Chemical Engineering Science, 2000, vol. 55, 4009-4020.

Pohl, B et al "Experimental study of continuous ultrasonic reactors for mixing and precipitation of nanoparticles" Chemical Engineering Science Nov. 11, 2011, vol. 69, 365-372.

Pohl, B. et al, Poster, "Untersuchungen zur Optimierung von kontinuierlichen Ultraschalldurchflussreaktoren", publicly available at least as early as Dec. 20, 2010.

Pohl, B. et al, Poster "Optimierung von Ultraschallfällungsreaktoren—kontrollierte Nanopartikelherstellung", publicly available at least as early as Dec. 20, 2010.

Printout of: "Ultrasonic Precipitation Process", retrieved from: www.hielscher.com/precipitation_01.htm—publicly available at least as early as Dec. 2010.

Suslick, Kenneth S. "Sonochemistry", Science, vol. 247, Mar. 1990, 1439-1445.

Boels, L. et al "Seeded calcite sonocrystallization", Journal of Crystal Growth, 312, 2010, 961-966.

Antipov, Alexei A. et al, "Carbonate microparticles for hollow polyelectrolyte capsules fabrication", Colloids and Surfaces A: Physicochem. Eng. Aspects 224, 2003, 175-183.

Tong et al, "Selective removal of particle cores to fabricate manganese carbonate hollow spheres and composite microcapsules", Colloids and Surfaces A: Physicochem. Eng. Aspects 295, 2007, 233-238.

Examination Report No. 1, dated Feb. 14, 2014, issued against corresponding Australian Patent Application No. 2011350062.

First Office Action dated Aug. 25, 2014 for corresponding Chinese Patent Application No. 201180067760.9, with English summary.

Examination Report No. 2 dated May 27, 2015 for corresponding Australian Patent Application No. 2011350062.

Second Office Action dated Jun. 15, 2015 for corresponding Chinese Patent Application No. 201180067760.9, with English summary.

* cited by examiner

TRANSITION METAL COMPOUND PARTICLES AND METHODS OF PRODUCTION

CROSS-REFERENCE TO RELATED APPLICATIONS

This application is a U.S. National Phase Entry of Patent Application No. PCT CA2011/050780, filed Dec. 16, 2011, which claims the benefit of priority of U.S. Provisional Patent Application Ser. No. 61/542,974, filed Oct. 4, 2011 and of U.S. Provisional Patent Application Ser.No. 61/428,284, filed Dec. 30, 2010, the content of which are hereby incorporated by reference herein for all purpose.

FIELD

The present disclosure relates generally to metal compound particles and methods of their production. More particularly, the present disclosure relates to transition metal compound particles and sonication-based methods of production.

BACKGROUND

The control of particle size, morphology or both is important in some circumstances. Particles size can be affected after production of the particles using processes such as milling, but such processes may have a detrimental effect on the material properties. During precipitation or crystallization from solution, particle size, morphology or other properties may be controlled.

Crystallization or precipitation is achieved by mixing a solvent containing an active principal to be crystallized with an anti-solvent, so that after mixing the solution is supersaturated and crystallization occurs. Precipitation can also be achieved by the reaction of two or more reagents that form a product which has reduced solubility in the solvents being used. The resulting insoluble reaction product precipitates or crystallizes from the solution. In such a situation, the solvents being used in the reaction would be considered to be anti-solvents with respect to the reaction product. The term "anti-solvent" means a fluid which promotes precipitation of the active principal from the solvent. The anti-solvent can be the same liquid as the solvent but at a different temperature, it may be a different liquid from the solvent, or (in the case of two reagents reacting to form a new product) it may be the solvent used in the reaction.

Ultrasonic irradiation (or sonication) has been used while precipitating or crystallizing particles. For example, Hussein OUBANI and others, in the Asia-Pacific Journal of Chemical Engineering 5 (2010) 599-608, describe the precipitation of NaCl microparticles from a NaCl—Ethanol—Water antisolvent system; L. BOELS and others, in the Journal of Crystal Growth 312 (2010) 961-966, describe the crystallization of a supersaturated calcite suspension under ultrasonic irradiation; and I. NISHIDA, in Ultrasonics Sonochemistry 11 (2004) 423-428, describes the ultrasonic irradiation of a supersaturated solution of calcium carbonate.

Hielscher Ultrasonics produces ultrasonic devices and describes an ultrasonic precipitation process at <http://www.hielscher.com/ultrasonics/precipitation_01.htm>.

A poster presentation by B. POHL, N. ÖZYLIMAZ, G. BRENNER, and U. PEUKER, entitled "Untersuchungen zur Optimierung von kontinuierlichen Ultraschalldurchflussreaktoren", publically available at least as early as Dec. 20, 2010, describes how flow chamber size and geometry of ultrasonic reactors affect the formation of $I_3^-$ and $BaSO_4$.

A poster presentation by B. POHL, G. BRENNER, and U. PEUKER, entitled "Optimierung von Ultraschallfällungsreaktoren—kontrollierte Nanopartikelherstellung", publically available at least as early as Dec. 20, 2010, teaches that ultrasonic precipitation reactors can be used to form agglomerations of $Fe_3O_4$ particles, where the agglomerates are between 20 nm and 300 nm (cavitation field reactor) or between 20 nm and 1 µm (conical reactor).

A review article discussing the chemical effects of ultrasonic irradiation was authored by Kenneth SUSLICK in Science 247:4949 (1990) 1439-1445. Another review article, by G. RUECROFT and others in Organic Process Research & Development, discusses the application of ultrasound to crystallization of organic molecules, and discusses equipment that could be used in industrial environments, such as parallel plate transducer systems.

Chunling LU and Jinglin ZHANG, in The Journal of the Chinese Ceramic Society 35:3 (2007) 377-380, describe subjecting a reaction of manganese sulfate ($MnSO_4$) and ammonium bicarbonate ($NH_4HCO_3$) to ultrasonic irradiation, using an ultrasonic bath having an intensity of about 1 W/cm$^2$, to form cubical manganese carbonate ($MnCO_3$) particles from 400 to 500 nm.

Ting-Feng YI and Xin-Guo HU, in the Journal of Power Sources 167 (2007) 185-191, disclose preparing sub-micro spinel $LiNi_{0.5-x}Mn_{1.5+x}O_4$ (x<0.1) cathode materials with homogeneous particle size using an ultrasonic-assisted co-precipitation of $LiNO_3$, $Mn(NO_3)_2$, and $Ni(NO_3)_2.6H_2O$. The precipitation was sonicated at 80° C. for 5 h in an ultrasonic cleaner at 50 W and 28 kHz.

Peizhi SHEN and others, in the Journal of Solid State Electrochemistry (2005) 10:929-933, describe preparing a $LiCr_xMn_{2-x}O_4$ (x=0, 0.02, 0.05, 0.08, 0.10) compound with spinel crystal structure using an ultrasonic co-precipitation method. Lithium acetate, manganese acetate, chromic nitrate and citric acid were dissolved in water and treated in an ultrasonic bath.

U.S. Patent App. No. 2010/0018853 describes the control of crystal and precipitate particle size of pharmaceutical drugs or other medicaments using ultrasonic irradiation.

Ultrasonic irradiation is also used in other processes for preparing particles. Tingfeng Y I, Xinguo H U and Kun G A O, in the Journal of Power Sources 162 (2006) 636-643, prepare Al-doped $LiAl_{0.05}Mn_{1.95}O_4$ powders using an ultrasonic assisted sol-gel method, using adipic acid as a chelating agent. A sol-gel process is a wet-chemical technique used primarily for the fabrication of materials (typically a metal oxide) starting from a chemical solution (or sol) that acts as the precursor for an integrated network (or gel) of either discrete particles or network polymers. Stoichiometric amounts of reactants $Li(CH_3COO).2H_2O$, $Al(NO_3)_3.9H_2O$ and $Mn(CH_3COO)_2.6H_2O$ were used to prepare the $LiAl_{0.05}Mn_{1.95}O_4$ powders.

S. H. PARK and others, in the Journal of Applied Electrochemistry (2003) 33: 1169-1173, describe the preparation of $Li[Ni_{1/2}Mn_{1/2}]O_2$ using an ultrasonic spray pyrolysis method. In spray pyrolysis, the dissolved reagents are atomized using an ultrasonic nebulizer and the resulting aerosol stream is introduced into a heated reactor. They teach that stoichiometric amounts of Ni and Mn nitrate salts (cationic ratio of Ni:Mn—1:1) were dissolved in water and that the dissolved solution was added to a continuously agitated aqueous citric acid solution, which was used as a polymeric agent for the reaction. The starting solution was atomized using an ultrasonic nebulizer with a resonant frequency of 1.7 MHz and the aerosol stream was introduced into a reactor heated at 500° C.

In a similar process, S. H. PARK and others, in Electrochimica Acta 49 (2004) 557-563, teach the preparation of $Li[Ni_{1/3}Co_{1/3}Mn_{1/3}]O_2$ materials using a spray pyrolysis method, where citric acid is again used as a polymeric agent for the reaction.

Spherical particles can be used in the preparation of battery materials, as discussed by SUN and others in Process of Precipitation for Spherical Manganese Carbonate and Their Products Produced Thereby (WO 2006/109940), as well as in the pharmaceutical industry. Weijun TONG and Changyou GAO, in Colloids and Surfaces A: Physiochem Eng. Aspects 295 (2007) 233-238, describe the preparation of hollow spherical manganese carbonate capsules by the reaction of manganese sulfate and ammonium bicarbonate solutions to form manganese carbonate particles and then acid dissolution of the particle cores. Similarly, Alexei ANTIPOV and others, in Colloids and Surfaces A: Physiochem Eng. Aspects 224 (2003) 175-183, describe the formation of hollow capsules made using cadmium carbonate particles, manganese carbonate particles and calcium carbonate particles as core templates for adsorption of oppositely charged polyelectrolytes and subsequent core removal.

Although ultrasonic irradiation has been used during precipitation of metal compound particles, as described above, it is desirable to provide an ultrasonic irradiation-based method that allows for the production of particles with desired morphologies, desired size distribution and/or desired particle sizes.

SUMMARY

It is an object of the present disclosure to obviate or mitigate at least one disadvantage of previously described methods, systems and/or particles.

There is described herein a method of preparing insoluble transition metal compound particles in a reaction chamber, said particles represented by the formula (TM)(S'), the method comprising: providing a transition metal salt solution, the transition metal salt having the formula (TM)(S) and comprising transition metal component (TM) is one or more transition metal independently selected from the group consisting of Mn, Ni, Co, Mg, Zn, Ca, Sr, Cu, Zr, P, Fe, Al, Ga, In, Cr, Ge and Sn; providing source of an anionic compound, the anionic compound being a carbonate-, hydroxide-, phosphate-, oxyhydroxide- or oxide-based compound, said anionic compound comprising an anionic component represented by S', wherein said anionic component is reactive with the transition metal component TM to form the insoluble transition metal compound particles; adding the transition metal salt solution and the anionic compound to a reaction chamber; and subjecting the reaction chamber to sonication at an intensity of from about 0.1 W/mL to about 50 W/mL to form the insoluble transition metal compound particles.

The intensity may be from about 1 W/mL to about 10 W/mL. In some examples, the intensity may be about 3 W/mL.

The transition metal salt solution may include $MnSO_4$, $Mn(CH_3COO)_2$, $MnCl_2$, or $Mn(NO_3)_2$.

The source of the anionic compound may be a solution comprising $Na_2CO_3$, $NH_4HCO_3$, $(NH_4)_2CO_3$, $NH_4OH$, $NaHCO_3$, $NaOH$, $KHCO_3$, $K_2CO_3$, $KOH$, $H_3PO_4$, $NaH_2PO_4$, $Na_2HPO_4$, $(NH_4)_3PO_4$, $(NH_4)_2HPO_4$, $(NH_4)H_2PO_4$, $(NH_4)_2NaPO_4$, $(NH_4)Na_2PO_4$, $KH_2PO_4$, $K_2HPO_4$, $(NH_4)_2KPO_4$, $(NH_4)K_2PO_4$ or $KMnO_4$. In some examples, the source of the anionic compound may be a solution comprising $Na_2CO_3$ and/or $NH_4HCO_3$.

The ratio of the anionic compound to the transition metal salt in the reaction chamber may be from about 1:1.5 to about 1.5:1. In some examples, the ratio of the anionic compound to the transition metal salt in the reaction chamber may be about 1:1.

The sonication may be provided by a probe tip, by vibrating diaphragms, or by any number of ultrasonic transducers attached to reaction chamber walls.

The reaction chamber may include a flow-through or continuous chamber.

The insoluble transition metal compound particles may be spherical, quasi-spherical or irregular in shape.

The insoluble transition metal compound particles produced may have a particle size distribution of at least 90% of particles within 1 μm and 50 μm; at least 90% within 1 μm and 30 μm; at least 90% within 3 μm and 20 μm; or at least 90% within 3 μm and 10 μm.

The insoluble transition metal compound particles produced may include $MnCO_3$ and have a tap density from about 1.5 g/mL to about 3.0 g/mL.

The insoluble transition metal compound particles produced may have a tap density from about 1.7 g/mL to about 2.3 g/mL.

The method may be performed where the transition metal salt solution comprises $MnSO_4$, the source of the anionic compound is a solution comprising $Na_2CO_3$ and/or $NH_4HCO_3$, the ratio of $MnSO_4$ to $Na_2CO_3$ and/or $NH_4HCO_3$ is from about 1:1.5 to about 1.5:1, and the particles include $MnCO_3$ have a tap density of from about 1.7 g/mL to about 2.3 g/mL.

The volume of the reaction chamber may be 300 mL or greater. The transition metal salt solution and the anionic compound may be added to a reaction chamber via reagent entry ports positioned more than about 10 cm apart from each other.

The residence time in the reaction chamber may be from about 1 second to about 60 minutes, for example from about 5 seconds to about 30 minutes, or for example from about 10 seconds to about 5 minutes.

The method may also include adding a chelating agent to the reaction chamber. The chelating agent may be ammonium sulfate, ammonium hydroxide, ammonium chloride, ammonium acetate, ammonium nitrate, urea, or any mixture thereof Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 1:
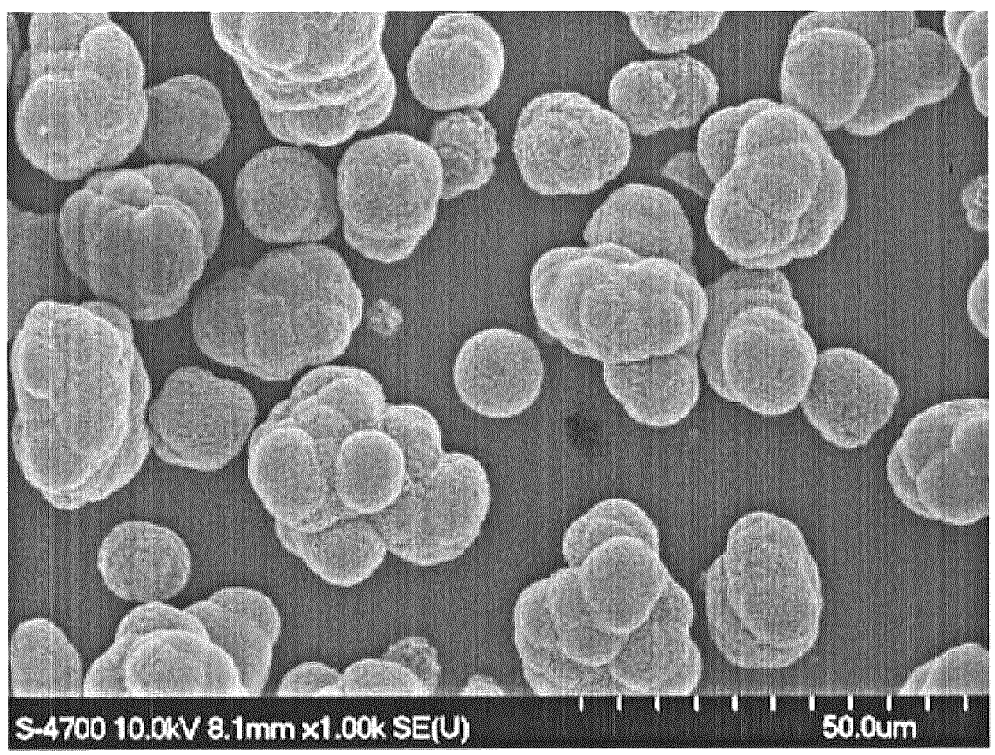
FIG. 1 is a scanning electron microscope micrograph of manganese carbonate particles produced in a tank reactor.

Generally, the present disclosure provides a method and system for producing particles having desired morphologies, desired size distribution and/or desired particle sizes. A particle's morphology refers to the shape of the particle. For example, a precipitated or crystallized particle could be spherical, or quasi-spherical, cubic, or rod-like. Quasi-spherical particles refer to particles where not all particles are similarly shaped, but that the shape of most particles constitutes a shape that approaches a spherical shape without being perfectly spherical.

It can be desirable to form spherical or quasi-spherical particles since powders that are composed of spherical or quasi-spherical particles can act more fluid-like and can exhibit less agglomeration under heating in comparison to irregularly shaped particles. Further, spherical or quasi-spherical particles can pack together to reduce void volume and increase tap density. Battery materials composed of spherical or quasi-spherical particles can perform better and can have a longer cycle life than batteries made using materials composed of irregular particles. Irregularly shaped particles have surfaces that are under stress due to sharp edges and folds, whereas spherical or quasi-spherical particles lack such sharp edges and folds, leading to reduced particle degradation. Particles can also be coated with other materials. Coatings made with spherical or quasi-spherical particles can be more uniform than coatings made with irregularly shaped particles. Even so, there may be applications in which irregularly shaped particles are desirable.

Particle size for a spherical precipitate can be defined by its diameter. With irregular and non-spherical particles, a volume-based particle size can be approximated by the diameter of a sphere that has the same volume as the non-spherical particle. Similarly, an area-based particle size can be approximated by the diameter of the sphere that has the same surface area as the non-spherical particle. The particle size for non-spherical particles can be calculated using other comparable properties, resulting in weight-based, hydrodynamic-based or aerodynamic-based particle sizes. In the present disclosure, particle size and volume-based particle size are used interchangeably.

The particle size distribution of a powder or particles dispersed in a fluid is a list of values that defines the relative amount of particles present, sorted according to size. Particle size distribution can be measured using a variety of techniques. Particle size distribution can be expressed in terms of a percentage of the sample between an upper limit and a lower limit, e.g. 80% of the sample between 10 µm and 20 µm. Alternatively, particle size distribution can be expressed in "cumulative" form, in which the total is given for all the sizes below an upper limit, e.g. 90% of the sample being less than 50 µm.

The size of the precipitated particles, the morphology of the precipitated particles, and the particle size distribution of the precipitated particles all affect the tap density of a sample. Tap density refers to the density of a sample after tapping it sufficiently to compact the sample so that the sample's density no longer changes. Depending on the size and shape of the particles produced, the tap density can be 10%, 20%, 30%, 40%, 50%, 60%, 70% or 80% of the crystal bulk density. Perfectly packed spheres of the same size could have a density of about 74% of the crystal bulk density, so perfectly packed spheres of $MnCO_3$ could have a density of about 74% of 3.70 g/mL. It is conceivable for the density to be greater than 74% for a sample of spheres of various sizes whereby the gaps left by large particles are filled by smaller particles.

Particles can be obtained in a batch process or in a continuous process. In a continuous process, a "flow through" reactor is used where the produced particles are continuously removed from the reactor by the addition of new reagents. The particles can be transition metal compound particles represented by the general formula (TM)(S'), where TM can be one or more transition metals independently selected from the group consisting of Mn, Ni, Co, Mg, Zn, Ca, Sr, Cu, Zr, P, Fe, Al, Ga, In, Cr, Ge and Sn, in any possible molar ratio; and where S' is the anionic component of the transition metal compound particle. The anionic component S' of the transition metal compound particles can be, for example, $CO_3$, $(OH)_2$, (OOH), $O_2$, $O_3$, $O_4$, $PO_4$, $(PO_4)_2$, or $P_2O_7$ resulting in the formula being, for example, $(TM)CO_3$, $(TM)(OH)_2$, (TM)(OOH), (TM)O, $(TM)O_2$, $(TM)O_3$, $(TM)O_{3/2}$, $(TM)O_{4/3}$, $(TM)PO_4$, $(TM)(PO_4)_{2/3}$, or $(TM)(P_2O_7)_{1/2}$, depending on the overall valence charge of the TM component.

The transition metal component of the transition metal compound particles can come from a source of transition metal, for example a solution of a transition metal salt represented by the general formula (TM)(S) where S is any appropriate counter ion that allows the transition metal salt to dissolve in a solvent. Examples of such a transition metal salt include $(TM)SO_4$, $(TM)Cl_2$, $(TM)(CH_3COO)_2$, and $(TM)(NO_3)_2$ where S is $SO_4$, $Cl_2$, $(CH_3COO)_2$ and $(NO_3)_2$ respectively. The anionic component of the transition metal compound particle can come from any relevant source of anionic compound, for example another salt solution, such as a solution of $NH_4HCO_3$, $Na_2CO_3$, $(NH_4)_2CO_3$, $NH_4OH$, $NaHCO_3$, NaOH, $KHCO_3$, $K_2CO_3$, KOH, $H_3PO_4$, $NaH_2PO_4$, $Na_2HPO_4$, $(NH_4)_3PO_4$, $(NH_4)_2HPO_4$, $(NH_4)H_2PO_4$, $(NH_4)_2NaPO_4$, $(NH_4)Na_2PO_4$, $KH_2PO_4$, $K_2HPO_4$, $(NH_4)_2KPO_4$, $(NH_4)K_2PO_4$ or $KMnO_4$.

In some embodiments, the transition metal compound particles can be $Mn_{(1-p-q)}M^2{}_pM^3{}_qCO_3$ particles (i.e. $M^1$ is Mn, $S'=CO_3$) where $M^2$ and $M^3$ are independently selected from the group consisting of Ni, Co, Mg, Zn, Ca, Sr, Cu, Zr, P, Fe, Al, Ga, In, Cr, Ge and Sn, where $p+q<1$, and where "p" and "q" are greater than or equal to 0. In particular embodiments, the transition metal compound particles that can be obtained include nickel manganese cobalt (NMC) carbonate particles with the formula $(Ni_pMn_{(1-p-q)}Co_q)CO_3$ (i.e. TM is $Ni_pMn_{(1-p-q)}Co_q$ where $M^1$ is Mn, $M^2$ is Ni, $M^3$ is Co, $S'=CO_3$), for example NMC carbonate particles having the formula $Ni_{1/3}Mn_{1/3}Co_{1/3}CO_3$. In other embodiments, the transition metal particles that can be obtained include manganese carbonate ($MnCO_3$) particles (i.e. "p" and "q"=0, $S'=CO_3$).

Manganese carbonate particles can be formed through the reaction between manganese sulfate ($MnSO_4$, i.e. TM=Mn, $S=SO_4$) and ammonium bicarbonate ($NH_4HCO_3$), though other sources of manganese, for example $Mn(NO_3)_2$, $Mn(CH_3COO)_2$, or $MnCl_2$, (where TM=Mn, $S=(NO_3)_2$, $(CH_3COO)_2$ or $Cl_2$, respectively) and other sources of carbonate, for example $Na_2CO_3$, $(NH_4)_2CO_3$, $NaHCO_3$, $KHCO_3$, or $K_2CO_3$, can be used. Still other sources of manganese and carbonate are known in the art. Although this disclosure discusses the reaction of manganese sulfate with ammonium bicarbonate to form manganese carbonate particles, and of manganese sulfate with sodium carbonate to form manganese carbonate particles, it is to be understood that alternative reagents could be similarly used to form alternative particles, such as $Ni_{1/3}Co_{2/3}(OH)_2$ (where TM=$Ni_{1/3}Co_{2/3}$, $S'=(OH)_2$) or $MgZnO_3$ (where TM=MgZn, $S'=O_3$).

Figure 2:
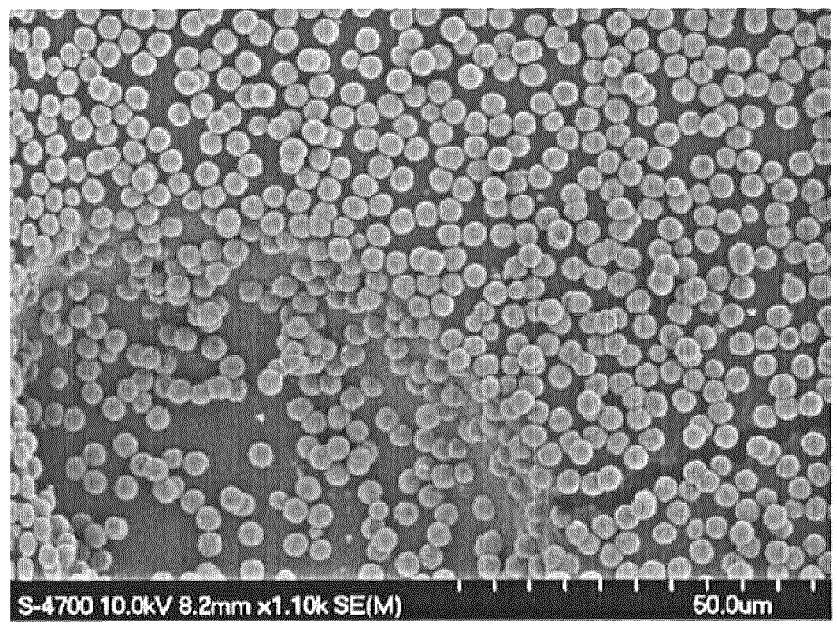
FIG. 2 is a scanning electron microscope micrograph of manganese carbonate particles produced in a tank reactor.
Figure 3:
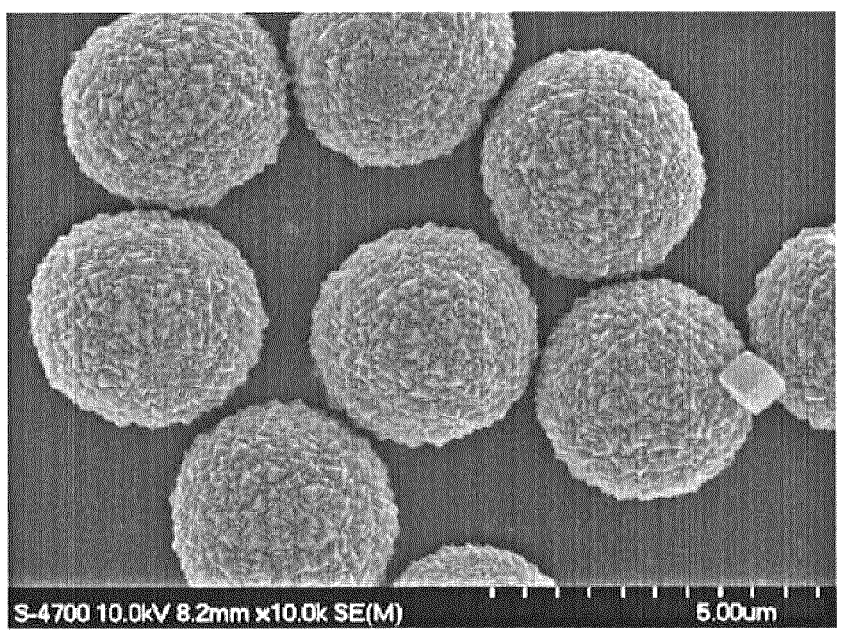
FIG. 3 is a scanning electron microscope micrograph of the manganese carbonate particles shown in FIG. 2, shown at a higher magnification.

The production of $MnCO_3$ particles in a tank reactor using $MnSO_4$ and $NH_4HCO_3$ at 1-2 M, or even higher concentrations, resulted in particles of up to 40 microns, with the produced particles having a large size distribution, as illustrated in FIG. 1. A reaction using $MnSO_4$ and $NH_4HCO_3$ at 1 mM resulted in spherical particles approximately 3.5 microns, with the produced particles having a small size distribution, as illustrated in FIG. 2 and FIG. 3. Although the particle size, particle morphology and particle size distribution of the particles produced in FIG. 2 and FIG. 3 can be desirable, the low concentration of the reagents used can result in undesirable levels of waste.

Methods and systems according to the present application can produce spherical particles having desired physical properties using higher concentrations of reagents (for example at reagent concentrations of greater than: 100 mM, 1 M, 2 M, 3 M, 4 M, 5 M or 10 M, depending on the reagent) than similar methods and systems which do not use ultrasonic irradiation. Quick and intimate mixing is possible when using ultrasonic irradiation. The ratio of the reagent concentrations used in the reaction can be chosen depending on the desired product and the chemical reaction forming the transition metal compound particles. Any ratio, including an excess of one or more reagents with respect to another reagent, could be used in the formation of the transition metal compound particles. In certain examples, it may be beneficial for no excess of reagents to be used.

Figure 4:
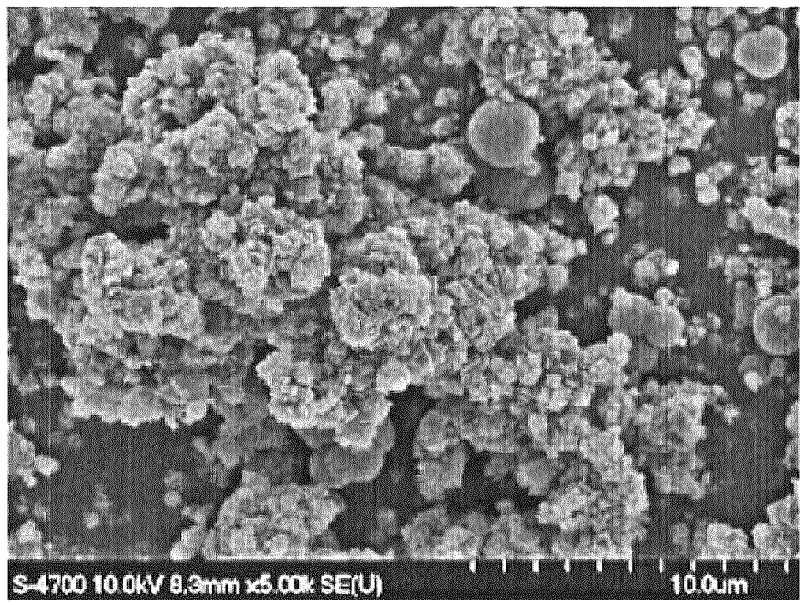
FIG. 4 is a scanning electron microscope micrograph of manganese carbonate particles produced in a continuous process reactor, without sonication.
Figure 5:
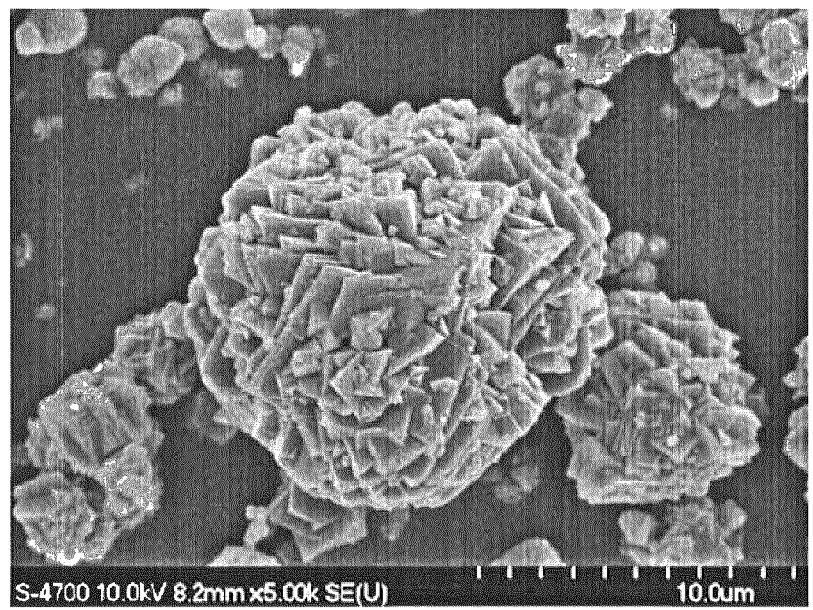
FIG. 5 is a scanning electron microscope micrograph of manganese carbonate particles produced in a continuous reactor, with soniation, according to an aspect the present application.

The $MnCO_3$ particles produced in a continuous reactor by the reaction of $MnSO_4$ and $NH_4HCO_3$ at 0.2 M are shown in FIG. 4 (no sonication) and FIG. 5 (sonication using a 40 W ultrasonic cleaner). As illustrated by FIG. 4 and FIG. 5, sonication of the reaction solution results in individual grains being produced, while no sonication results in agglomerated particles.

A method of preparing insoluble transition metal compound particles in a reaction chamber is described herein. The particles formed are represented by the formula (TM)(S'). The method comprises providing a transition metal salt solution, the transition metal salt having the formula (TM)(S) and comprising transition metal component (TM) where (TM) is one or more transition metal independently selected from the group consisting of Mn, Ni, Co, Mg, Zn, Ca, Sr, Cu, Zr, P, Fe, Al, Ga, In, Cr, Ge and Sn; providing source of an anionic compound, the anionic compound being a carbonate-, hydroxide-, phosphate-, oxyhydroxide- or oxide-based compound, said anionic compound comprising an anionic component represented by S', wherein said anionic component is reactive with the transition metal component TM to form the insoluble transition metal compound particles; adding the transition metal salt solution and the anionic compound to a reaction chamber; and subjecting the reaction chamber to sonication at an intensity of from about 0.1 W/mL to about 50 W/mL to form the insoluble transition metal compound particles.

The intensity may be from about 0.1 W/mL to about 10 W/mL, for example about 3 W/mL.

The transition metal salt solution may comprise $MnSO_4$, $Mn(CH_3COO)_2$, $MnCl_2$, or $Mn(NO_3)_2$.

The source of the anionic compound is a solution comprising $Na_2CO_3$, $NH_4HCO_3$, $(NH_4)_2CO_3$, $NH_4OH$, $NaHCO_3$, $NaOH$, $KHCO_3$, $K_2CO_3$, $KOH$, $H_3PO_4$, $NaH_2PO_4$, $Na_2HPO_4$, $(NH_4)_3PO_4$, $(NH_4)_2HPO_4$, $(NH_4)H_2PO_4$, $(NH_4)_2NaPO_4$, $(NH_4)Na_2PO_4$, $KH_2PO_4$, $K_2HPO_4$, $(NH_4)_2KPO_4$, $(NH_4)K_2PO_4$ or $KMnO_4$. In exemplary embodiments, the source of the anionic compound is a solution comprising $Na_2CO_3$ or $NH_4CO_3$.

An exemplary ratio of the anionic compound to the transition metal salt in the reaction chamber may be from about 1:1.5 to about 1.5:1, such as for example about 1:1.

Sonication may be provided by a probe tip, by vibrating diaphragms, or by any number of ultrasonic transducers attached to reaction chamber walls.

The reaction chamber may comprise a flow-through chamber.

The insoluble transition metal compound particles may be generally spherical in shape, or may be quasi-spherical, meaning not all particles are similarly shaped, but that the shape of most particles constitutes a shape that approaches a spherical shape without being perfectly spherical.

In exemplary embodiments, the insoluble transition metal compound particles produced may have a particle size distribution of at least 90% of particles within 1 μm and 50 μm; at least 90% within 1 μm and 30 μm; at least 90% within 3 μm and 20 μm; or at least 90% within 3 μm and 10 μm.

According to certain embodiments, the insoluble transition metal compound particles produced may comprise $MnCO_3$ and have a tap density from about 1.5 g/mL to about 3.0 g/mL. For example, the insoluble transition metal compound particles produced may have a tap density from about 1.7 g/mL to about 2.3 g/mL.

In certain embodiments, the transition metal salt solution may comprise $MnSO_4$, the source of the anionic compound can be a solution comprising $Na_2CO_3$ and/or $NH_4CO_3$, the ratio of $MnSO_4$ to $Na_2CO_3$ and/or $NH_4CO_3$ may be from about 1:1.5 to about 1.5:1, and particles may comprise $MnCO_3$ with a tap density of from about 1.7 g/mL to 2.3 g/mL.

The volume of the reaction chamber, according to exemplary embodiments, may be about 300 mL or greater.

The residence time in the reaction chamber may be from about 1 second to about 60 minutes, may be from about 5 seconds to about 30 minutes, or may be from about 10 seconds to about 5 minutes.

Figure 6:
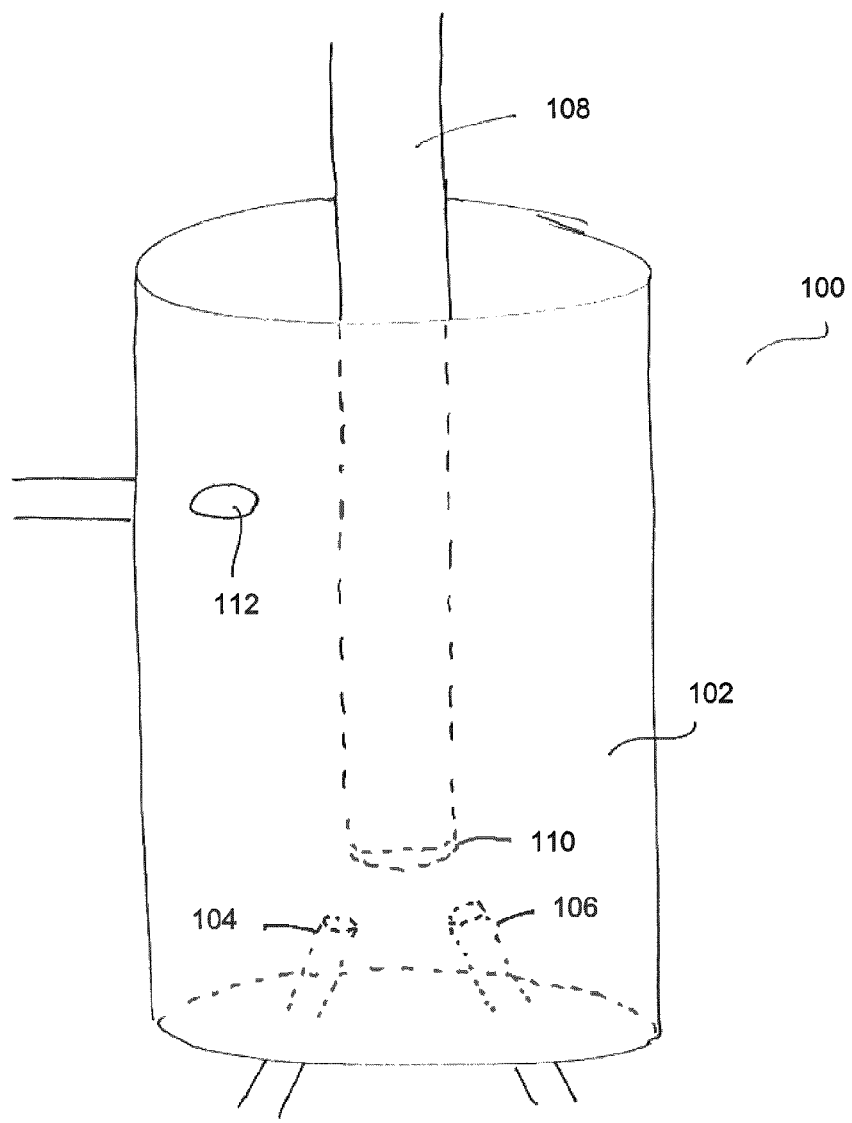
FIG. 6 is an illustration of a continuous process reactor according to one embodiment of the present application.

A reactor for continuous generation of particles can have a reaction chamber with at least one entry, a source of ultrasonic irradiation (also referred to as a sonicator) for providing the ultrasonic irradiation to the reaction chamber, and at least one outlet port for removing the reaction overflow. In reactors with one entry port, the reaction solutions (for example, the $MnSO_4$ solution and the $NH_4HCO_3$ solution) can be pre-mixed before being injected into the reaction chamber. In reactors with two entry ports, one of the entry ports can be for one of the reaction solutions (e.g. the $MnSO_4$ solution) and another entry port can be for the other reaction solution (e.g. the $NH_4HCO_3$ solution). An embodiment of a reactor with two entry ports is illustrated in FIG. 6, which shows reactor 100, reaction chamber 102, reagent entry ports 104 and 106, probe sonicator 108 having probe tip 110, and an outlet port 112 for removing the reaction overflow (which, in a reaction between $MnSO_4$ and $NH_4HCO_3$, would contain the generated $MnCO_3$ particles). The entry port(s) could be spaced between 1 mm and 50 cm away from themselves and/or from the source of the ultrasonic irradiation, or much greater (e.g. 1 m) depending on the power and intensity of the source of the ultrasonic irradiation and the size of the reaction chamber.

The source of ultrasonic irradiation can be, for example, a parallel transducer or a probe sonicator. One example of a probe sonicator is a Branson Sonifier™ 450A (Branson Ultrasonics of Danbury Conn., USA) that can operate at 400 W (10-100% amplitude variation) and 20 kHz. Sonicators, operating at other frequencies (such as frequencies between 20 and 80 kHz), and operating at up to 100 kW, could alternatively be used. A probe sonicator can have a flat probe tip between 1 mm and 10 cm in diameter, or larger depending on the power and intensity of the source of the ultrasonic irradiation. In particular embodiments, the probe tip can be 1.2 cm in diameter (having a surface area of 1.13 $cm^2$). The probe tip can be vibrated with an amplitude of between 10 μm and 5 cm. In particular embodiments, the probe tip can be vibrated with an amplitude of about 150 μm. At maximum power, a Branson Sonifier 450A probe sonicator can have an intensity of about 350 $W/cm^2$ using a probe tip with a diameter of 1.2 cm. Sonicators operating at an intensity of up to about 2000 $W/cm^2$ can alternatively be used. The probe tip can be made of a variety of materials and can have a variety of textures.

Sonicators operated in air have a power output approaching zero since the viscosity of air is low. As the viscosity of the medium increases, the sonicator uses more power to vibrate. Sonifiers may show the actual power required to operate on the machine. For the Branson Sonifier 450A operated in an aqueous medium with a 1.2 cm diameter flat probe tip, the power output is about 30% of 400 W (that is 120 W) at 100% amplitude; and about 24% of 400W (that is 96 W) at 80% amplitude.

One or both of the two entry ports 104 and 106 can be positioned, as illustrated in FIG. 6, to direct the reagent solutions near the probe tip, where sonication is more intense. A reactor can additionally include an outer jacket (not shown) which can be used to heat or cool the reaction chamber to a desired temperature.

Instead of probe sonicators, other reactors may use vibrating diaphragms or ultrasonic transducers attached to the reaction chamber walls to provide the ultrasonic irradiation. The reactor may include entry ports positioned to direct the reagent solutions into the reactor to quickly mix the reagents.

Figure 7:
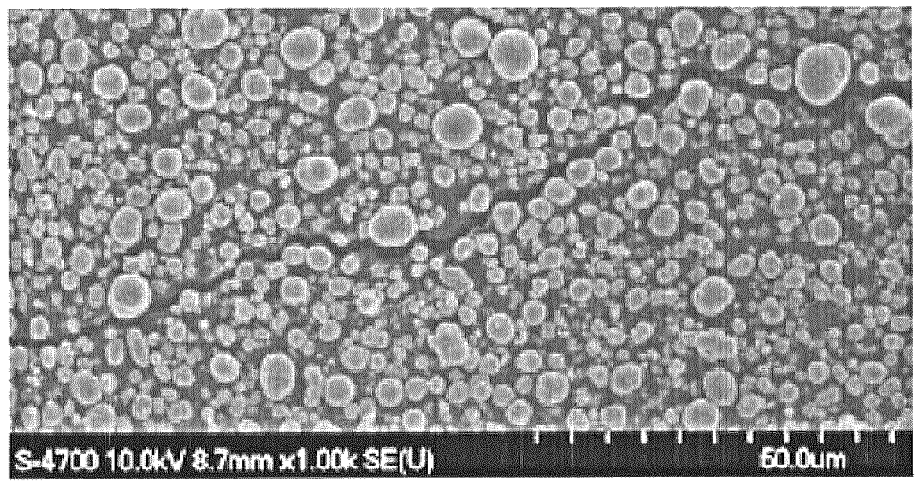
FIG. 7 is a scanning electron microscope micrograph of manganese carbonate particles produced in a continuous process reactor, according to an aspect of the present application.

$MnCO_3$ particles generated using a reactor having one entry port positioned to direct one of the two reagent solutions towards the probe head and the other entry port positioned to direct the second of the two reagent solutions away from the probe head, are illustrated in FIG. 7. To produce the particles illustrated in FIG. 7, 1 M solutions of $MnSO_4$ and $NH_4HCO_3$ were injected at 5 mL/min and mixed in a 50 mL continuous reactor at about 40° C. and operating an 80% of full amplitude (or about 1.9 W/mL). The produced particles have a tap density of 1.48 g/mL (or about 40% of the crystal bulk density).

Figure 8:
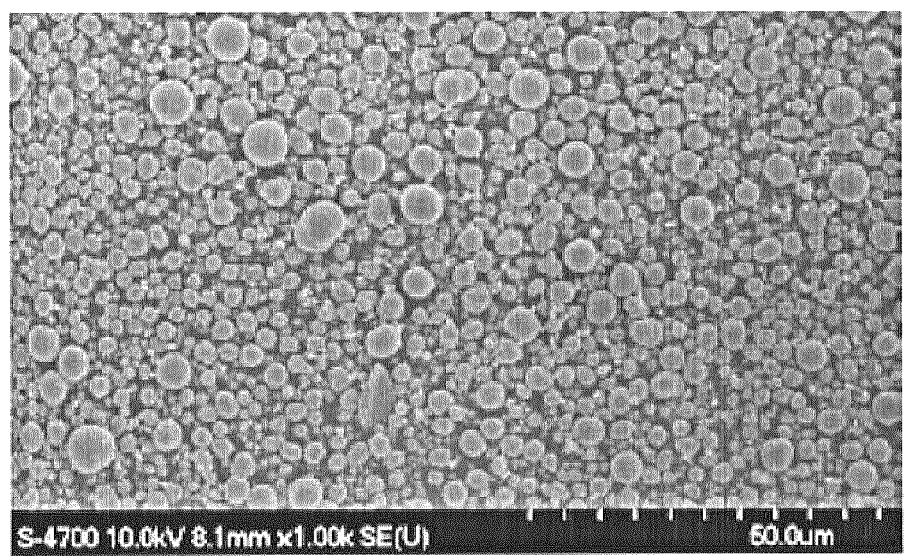
FIG. 8 is a scanning electron microscope micrograph of manganese carbonate particles produced in a continuous process reactor, according to an aspect of the present application.

$MnCO_3$ particles generated using a reactor with two entry ports positioned to direct the two reagent solution towards the probe head are illustrated in FIG. 8, with the reaction conditions being the same as those used to produce the particles illustrated in FIG. 7. The produced particles have a tap density of 1.59 g/mL (or about 43% of the crystal bulk density).

A reactor used to produce the transition metal compound particles can accept reagents at different flow rates and reagents at different concentrations; the reactor can maintain the reaction at varying temperatures and/or pressures. In reactors that use probes to generate the ultrasonic irradiation, the reactor can provide ultrasonic irradiation at varying probe intensities and frequencies using probe tips of varying sizes and positioned in a variety of different locations. The reaction chamber can vary in size and geometry, and can be fabricated of different materials, thereby providing different surface textures of the reaction chamber. The reaction chamber can be actively stirred, for example using a stir bar, or can be mixed simply by the injection of the reagents.

In reactors that use probes to generate the ultrasonic irradiation, the aperture size just below the probe tip can be changed. Copper chips, steel shavings or plastic mesh, for example, can be added to the reaction chamber to increase surface area. Gas, such as nitrogen, air or carbon dioxide, can be bubbled through the reaction chamber. Surfactants, such as Tween™-80 or mineral oil, and/or chelating agents can be added to the reaction solution. For example, the surfactants and/or chelating agents can be added to one of the reagents or fed directly to into the reaction chamber.

Chelating agents are agents which "coordinate" with the metal ion during particle growth and which may provide a mechanism for controlling particle size. Examples of chelating agents which may be added to the reaction include, for example: ammonium sulfate, ammonium hydroxide, ammonium chloride, ammonium acetate, ammonium nitrate, urea, or any combination thereof.

In particular embodiments of the reactor, the reagent entry ports are made from stainless steel tubing. The tubing can be movably adjustable so that the location of the reagent entry ports relative to the probe tip can be changed. In some embodiments, the reaction chamber can have a volume of between 2 mL and 1 L. Still larger sizes of reaction chambers are contemplated, for example reaction chambers having volumes of 25 L or larger, so long as the increased size of the chamber is offset by an increased sonication power and the ultrasonic irradiation intensity remains between about 0.1 W/mL and 50 W/mL.

In particular embodiments, the reagent flow rates can be independently set to be between 1 mL/min and 1 L/min, or higher depending on the size of the reaction chamber. The reagent flow rates and reactor chamber can be chosen so that the residence time of the reagents and produced transition metal compound particles in the reaction chamber is greater than 5 seconds (where residence time is calculated as: volume of reaction chamber divided by total flow rate of reagents). In particular embodiments, the residence time is 30 seconds or longer. In some embodiments, the resident time of the reagents can be 5 minutes or longer. In some embodiments, the reagent entry ports direct the reagents into a reaction volume where ultrasonic irradiation is provided at an intensity between about 0.1 W/mL and 50 W/mL thereby allowing the reagents to react before they move away from the ultrasonic irradiation. In one example, the reagent entry ports direct the reagents near the source of the ultrasonic irradiation, for example near a probe tip.

In particular embodiments, the ultrasonic irradiation provided by the probe can be between 10 and 100% of the maximum amplitude of the probe tip. The maximum amplitude of a probe tip being vibrated by a Branson Sonifier 450A is about 150 microns. Alternative probe tips can be vibrated by other sonifiers to larger amplitudes. Alternatively, other ultrasonic irradiation systems, such as diaphragm plate sonifiers, can be vibrated to larger amplitudes. In particular embodiments, the temperature of the reactor can be maintained using a heating or cooling jacket at a temperature between −20° C. and 100° C.

Figure 9:
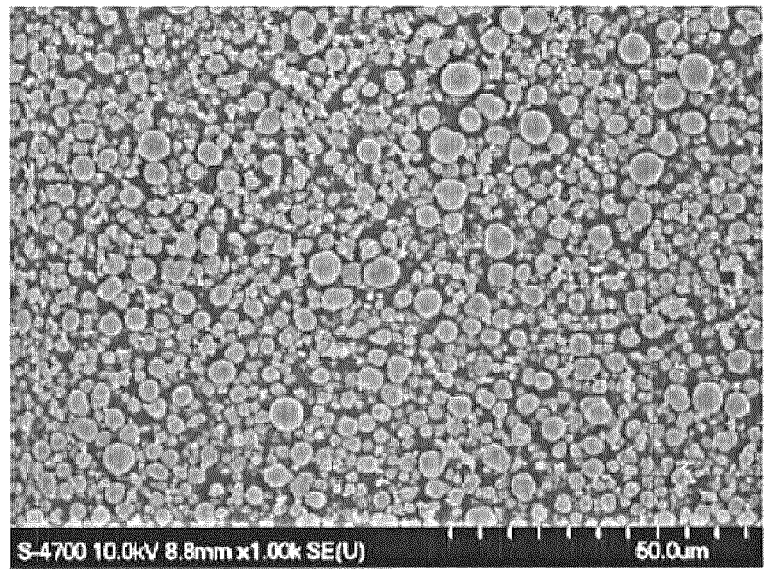
FIG. 9 is a scanning electron microscope micrograph of manganese carbonate particles produced in a continuous process reactor, according to an aspect of the present application.
Figure 10:
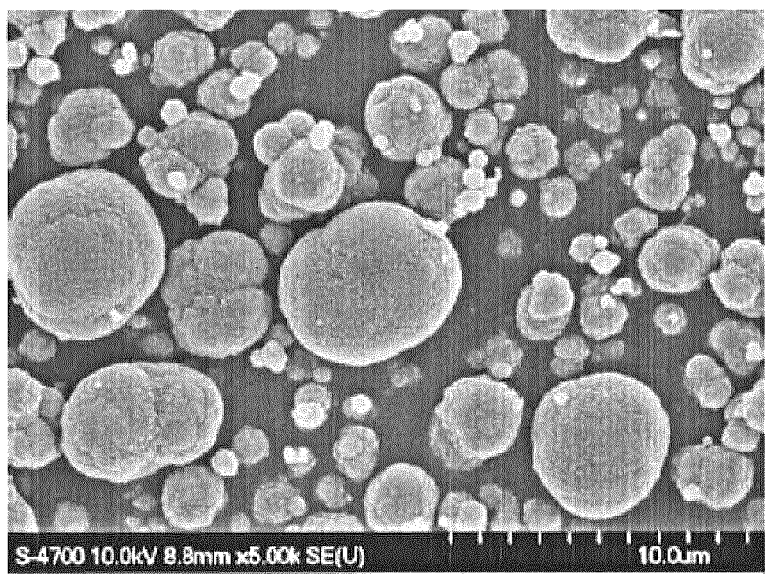
FIG. 10 is a scanning electron microscope micrograph of the manganese carbonate particles shown in FIG. 9, shown at a higher magnification.

In one particular reaction, 1 M $MnSO_4$ and 1 M $NH_4HCO_3$ solutions were injected into a 50 mL reaction chamber at 5 mL/min, and subjected to 80% of full amplitude of ultrasonic irradiation (or about 1.9 W/mL). The ambient temperature of the reaction was maintained in an ice bath at 0° C. The resulting manganese carbonate particles produced are shown in FIG. 9 and FIG. 10. These particles have a tap density of 1.40 g/mL (or about 38% of the crystal bulk density).

Figure 11:
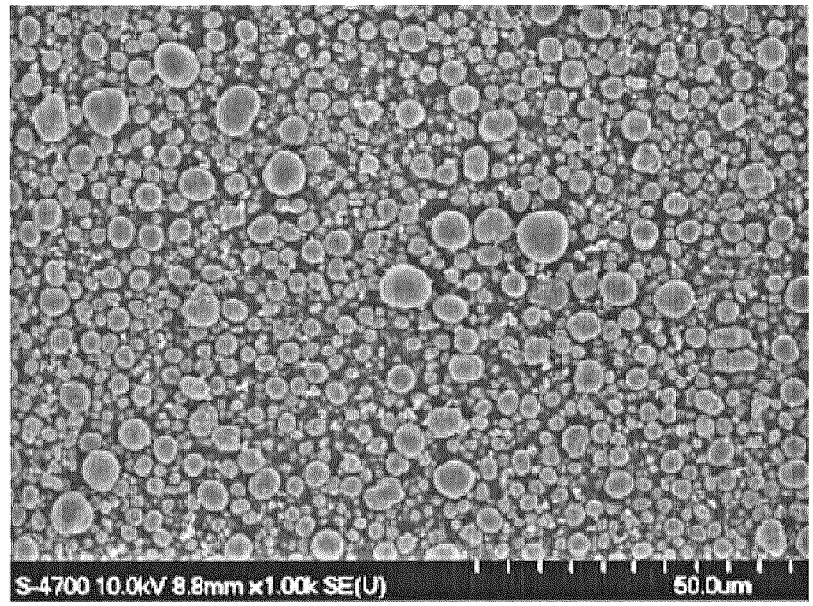
FIG. 11 is a scanning electron microscope micrograph of manganese carbonate particles produced in a continuous process reactor, according to an aspect of the present application.
Figure 12:
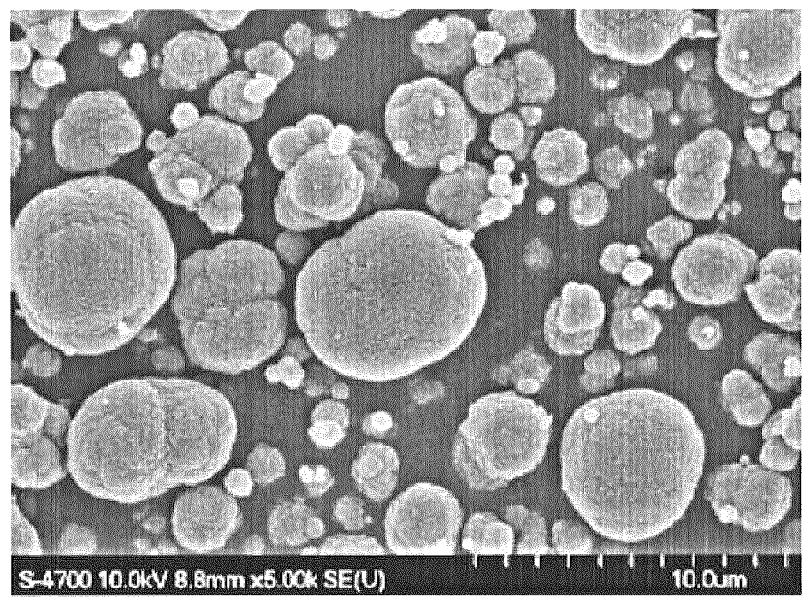
FIG. 12 is a scanning electron microscope micrograph of the manganese carbonate particles shown in FIG. 11, shown at a higher magnification.

In another reaction, 1 M $MnSO_4$ and 1 M $NH_4HCO_3$ solutions were injected into a 50 mL reaction chamber at 5 mL/min, and subjected to 80% of full amplitude of ultrasonic irradiation (or about 1.9 W/mL). The ambient temperature of the reaction was maintained at 90° C. The resulting manganese carbonate particles produced are shown in FIG. 11 and FIG. 12. These particles have a tap density of 1.71 g/mL (or about 46% of the crystal bulk density).

Figure 13:
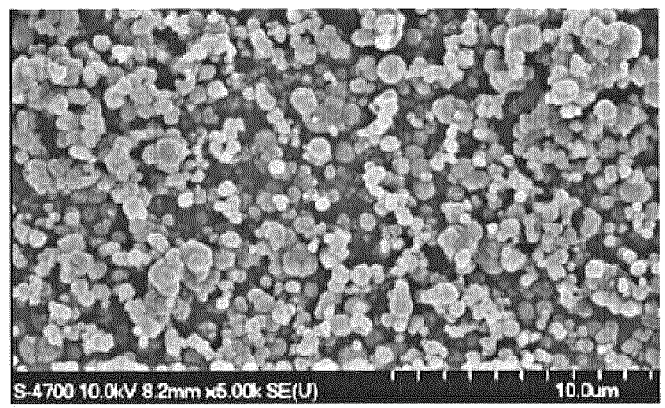
FIG. 13 is a scanning electron microscope micrograph of manganese carbonate particles produced in a continuous process reactor, according to an aspect of the present application.
Figure 14:
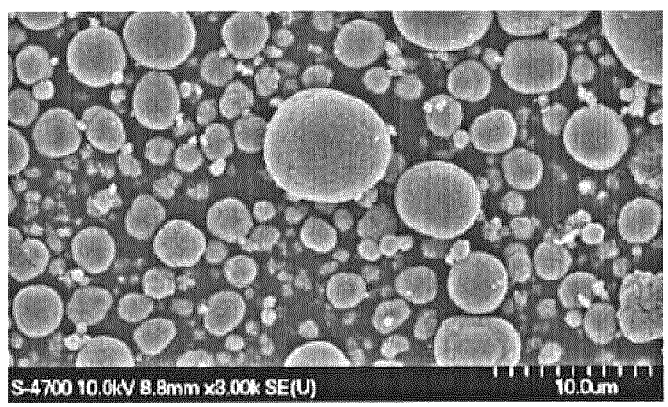
FIG. 14 is a scanning electron microscope micrograph of manganese carbonate particles produced in a continuous process reactor, according to an aspect of the present application.
Figure 15:
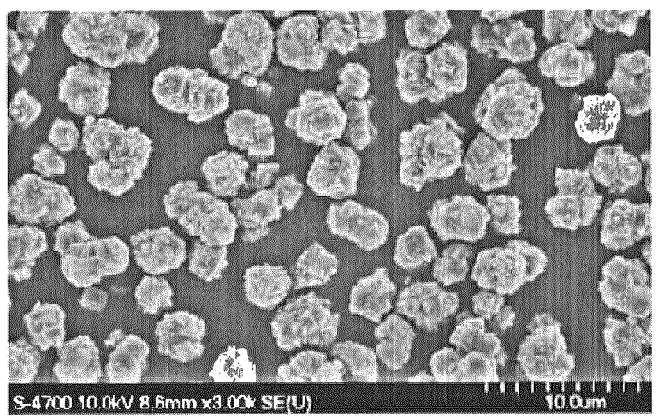
FIG. 15 is a scanning electron microscope micrograph of manganese carbonate particles produced in a continuous process reactor, according to an aspect of the present application.

Reactors having reaction chambers of different sizes can produce particles having different physical properties. For example, FIG. 13, FIG. 14 and FIG. 15 (all shown at the same scale) show manganese carbonate particles produced using reaction chambers of 3 mL, 50 mL and 500 mL, respectively, using similar reaction conditions as described above with respect to the formation of the particles illustrated in FIGS. 9-12. At 80% amplitude, the reactions were run at about 32 W/mL, about 1.9 W/mL and 0.19 W/mL, respectively. The produced particles have varied sizes and size distributions, as shown, with the particles illustrated in FIG. 14 having nicely shaped spherical particles with a large size distribution and the particles illustrated in FIG. 15 having irregularly shaped particles with a narrow size distribution.

Nickel manganese cobalt carbonate particles, where the nickel manganese cobalt source can include nickel, manganese and cobalt in any molar ratio, can be formed through the reaction between a nickel manganese cobalt source and a source of carbonate. For example, the nickel manganese cobalt carbonate particles can be $(Ni_{1/3}Mn_{1/3}Co_{1/3})CO_3$ particles, which can be formed through the reaction between a transition metal salt providing a nickel manganese cobalt source, for example ⅓ $NiSO_4$, ⅓ $MnSO_4$ and ⅓ $CoSO_4$ (written in shorthand notation as $(Ni_{1/3}Mn_{1/3}Co_{1/3})SO_4$ or NMC sulfate) or ⅓ $Ni(NO_3)_2$, ⅓ $Mn(NO_3)_2$ and ⅓ $Co(NO_3)_2$ (similarly written in shorthand notation as $(Ni_{1/3}Mn_{1/3}Co_{1/3})(NO_3)_2$), and a source of carbonate, for example ammonium bicarbonate ($NH_4HCO_3$). In the above chemical formulas for the transition metal salt, the transition metal component TM corresponds to $Ni_{1/3}Mn_{1/3}Co_{1/3}$ and the counter ion S of the salt corresponds to $SO_4$ or $(NO_3)_2$, respectively. In other embodiments, the nickel manganese cobalt source can be, in shorthand notation: $(Ni_{1/3}Mn_{1/3}Co_{1/3})(CH_3COO)_2$, or $(Ni_{1/3}Mn_{1/3}Co_{1/3})Cl_2$; and the carbonate source can be, for example, $(NH_4)_2CO_3$, $NaHCO_3$, $Na_2CO_3$, $KHCO_3$, or $K_2CO_3$.

Figure 16:
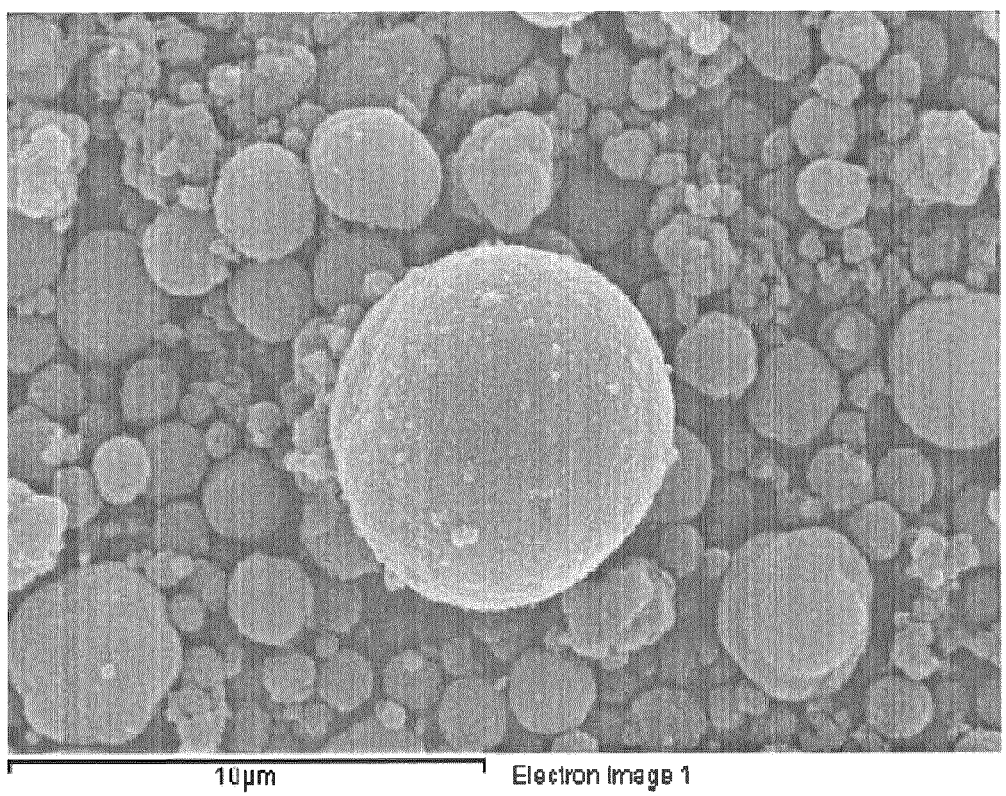
FIG. 16 is a scanning electron microscope micrograph of nickel manganese cobalt (NMC) carbonate particles produced in a continuous process reactor, according to an aspect of the present application.

In one particular embodiment, 0.2 M NMC sulfate and 1 M $NH_4HCO_3$ solutions were injected into a 50 mL reactor at 5 mL/min and subjected to ultrasonic irradiation at 80% of full amplitude (or about 1.9 W/mL). The resulting NMC carbonate particles are shown in FIG. 16.

Figure 17:
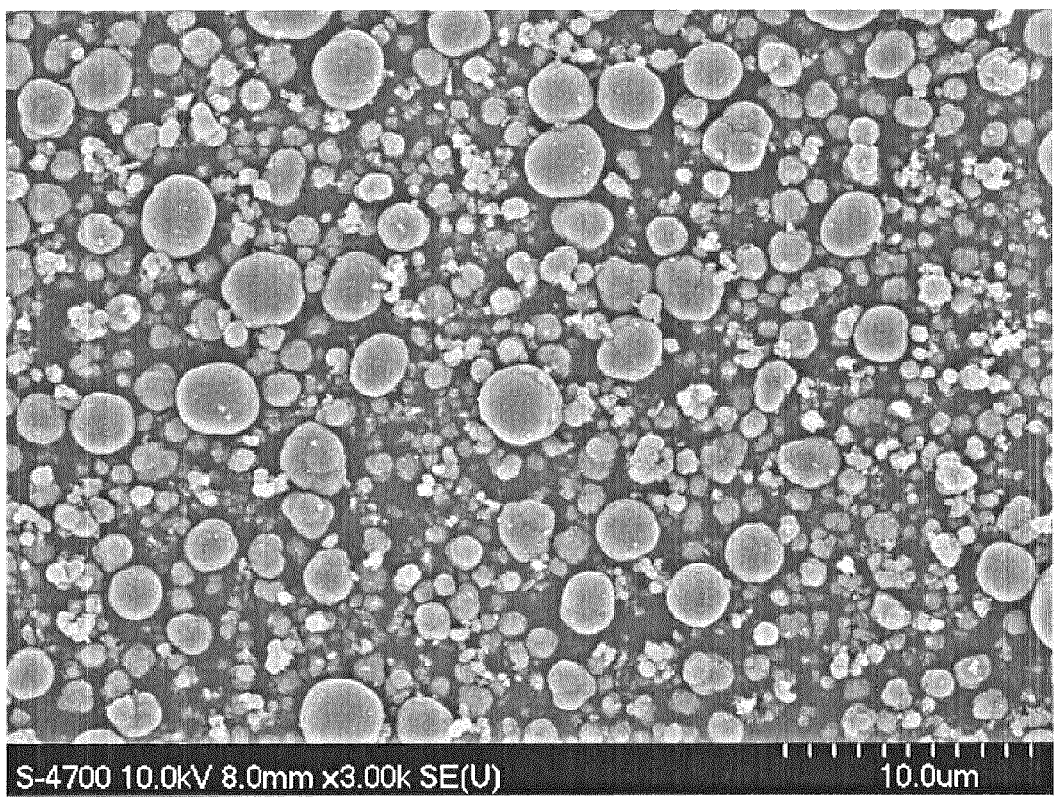
FIG. 17 is a scanning electron microscope micrograph of NMC carbonate particles produced in a continuous process reactor, according to an aspect of the present application.

In another embodiment, 0.2 M NMC sulfate and 2 M $NH_4HCO_3$ solutions were cooled to 3° C. before being injected into a 50 mL reactor heated to 70° C. at 5 mL/min and subjected to ultrasonic irradiation at 80% of full amplitude (or about 1.9 W/mL). The resulting NMC carbonate particles (shown in FIG. 17) have a tap density of 1.25 g/mL (or about 36% of the equimolar crystal bulk density).

After being collected, any produced particles can be dried, for example at 80° C. for several hours.

Additional Embodiments for Production of $MnCO_3$ Particles

According to a further embodiment of the invention, exemplary particles can be formed using high intensity sonication within a large volume. The large volume can lead to larger particles and advantageously lead to a narrow size distribution in the particles formed and the high intensity (high W/mL) can lead to spherical or quasi-spherical particles. By using reagents in roughly equivalent concentrations, the impact of having a large excess of one reactant can be avoided. Particles having a narrow size distribution would be understood to be particles that have size distribution of at least 90% of particles having a diameter within 25 μm from the mean diameter. In some embodiments, the particles would have at least 90% of particles having a diameter within 15 μm from the mean diameter. In other embodiments, the particles would have at least 90% of particles having a diameter within 10 μm from the mean diameter. In yet other embodiments, the particles would have at least 90% of particles having a diameter within 5 μm from the mean diameter. In some embodiments, the particles have a size distribution where at least 90% of particles are within 1 μm and 50 μm. In other examples, at least 90% of the particles are within 1 μm and 30 μm. In yet other examples, at least 90% of the particles are within 3 μm and 20 μm. In still further examples, at least 90% of the particles are within 3 μm and 10 μm.

While spherical particles have advantages for downstream use, quasi-spherical or irregularly shaped particles that are not quite spherical are also desirable, if the size distribution is narrow, and the tap density is relatively high.

A reaction chamber volume greater than 300 mL can be considered a large volume. A reaction chamber volume from 350 mL to 700 mL can be used to advantageously result in a narrow size distribution of particles, while permitting a high throughput. Volumes in excess of 700 mL may be used, such as 1 L, 5 L, 10 L and 25 L volumes, for example, provided the sonication equipment is adequate to provide an ultrasonic irradiation having an intensity between about 0.1 W/mL and 50 W/mL in the reaction volume and the flow rates are adequate to permit a suitable residence time.

In one particular test arrangement, a reaction chamber of 350 mL was used, with an indwelling sonicator adjacent to the reagent inputs. In one instance it was discovered that the filtrate had excess reagent—excess $NH_4HCO_3$ resulted in undesirable precipitation after adding $MnSO_4$ to the filtrate. Further, excess $MnSO_4$ was found to result in precipitation upon adding $NH_4HCO_3$, which is also undesirable.

Figure 18:
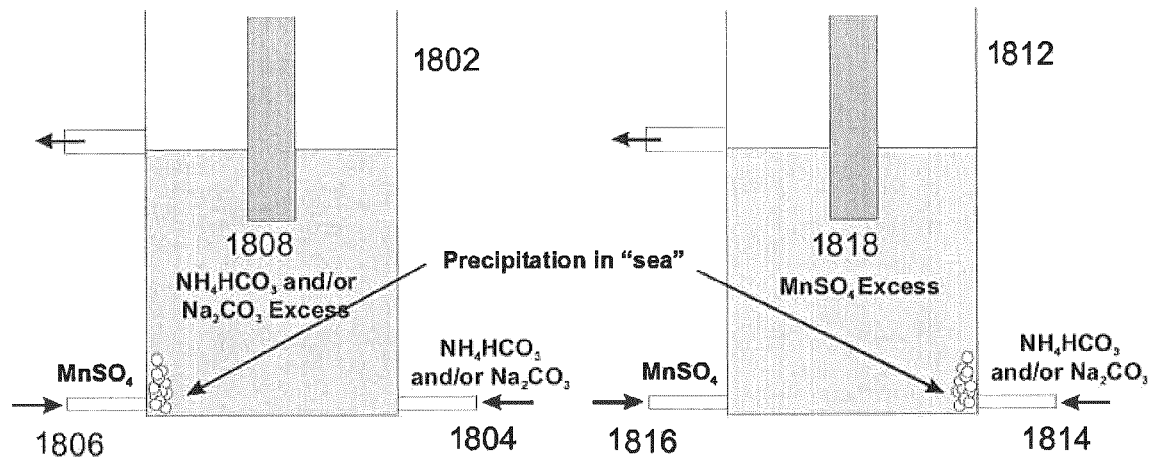
FIG. 18 is a schematic representation of the precipitation that may occur when a reagent is present in excess.

The reaction of $MnSO_4$ with $NH_4HCO_3$ forms the desired product $MnCO_3$ as well as $(NH_4)_2SO_4$, together with $CO_2$ and $H_2O$. The reaction of $MnSO_4$ with $Na_2CO_3$ forms the desired product $MnCO_3$ as well as $Na_2SO_4$. FIG. 18 is a schematic representation of the precipitation that can occur when one of the reagents is present in significant excess. Within the left hand reaction chamber (1802), $NH_4HCO_3$ and/or $Na_2CO_3$ occurs in excess. In this case, $NH_4HCO_3$ and/or $Na_2CO_3$ are added via an $NH_4HCO_3$ and/or $Na_2CO_3$ inlet (1804) and precipitation within the "$NH_4HCO_3$ and/or $Na_2CO_3$ sea" of the reaction chamber occurs near the $MnSO_4$ inlet (1806). Within the right hand reaction chamber (1812), $MnSO_4$ occurs in excess. In this case, $MnSO_4$ is added via an $MnSO_4$ inlet (1814) and precipitation within the "$MnSO_4$ sea" of the reaction chamber occurs near the $NH_4HCO_3$ and/or $Na_2CO_3$ inlet (1816). The sonicator, shown here in both instances as comprising a probe (1808 and 1818), can alternatively comprise another type of sonication device such as a diaphragm system or any number of ultrasonic transducers attached to the reaction chamber. This local precipitation near the inlets is undesirable. In these instances where excess reagent is present, precipitation occurs quickly upon entering the reaction chamber, which means that precipitation occurs at a relatively high concentration and in the presence of only a few particles. This leads to a wide distribution in particle sizes. It is desirable to attain a narrow size distribution. Thus, by avoiding excesses of reagent, the likelihood of producing particles with a wide size distribution is diminished.

Figure 19:
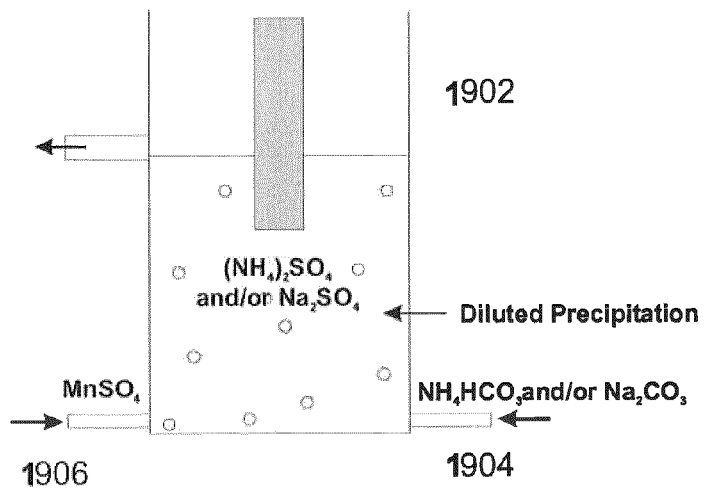
FIG. 19 is a schematic representation of the reaction when neither reactant is present in excess.

FIG. 19 is a schematic representation of the reaction when neither reactant is present in excess. Within the reaction chamber (1902), $NH_4HCO_3$ and/or $Na_2CO_3$ (1904) and $MnSO4$ (1906) are provided to form the desired $MnCO_3$ particles, as well as $(NH_4)_2SO_4$ and/or $Na_2SO_4$, or a mixture of these products in solution. Here, neither incoming reagent sees a "sea" of the other, so reagents are allowed to mix more intimately before precipitation occurs. This leads to more uniform particle growth, possibly because precipitation occurs at lower concentration and around many more particles. It may be advantageous to locate input ports for the two reagents relatively far away from each other in the chamber, to allow intimate mixing before precipitation occurs.

Using $Na_2CO_3$ was found to yield good tap density and good uniformity of particles (narrow size distribution). A good tap density of 1.6 to 2.2 g/mL can be achieved, and a tap density of about 2.1 g/mL was observed when using $Na_2CO_3$ with $MnSO_4$, in amounts such that that neither reagent was in excess. The reaction was conducted at 70° C. producing relatively uniform, quasi-spherical particles.

Figure 20:
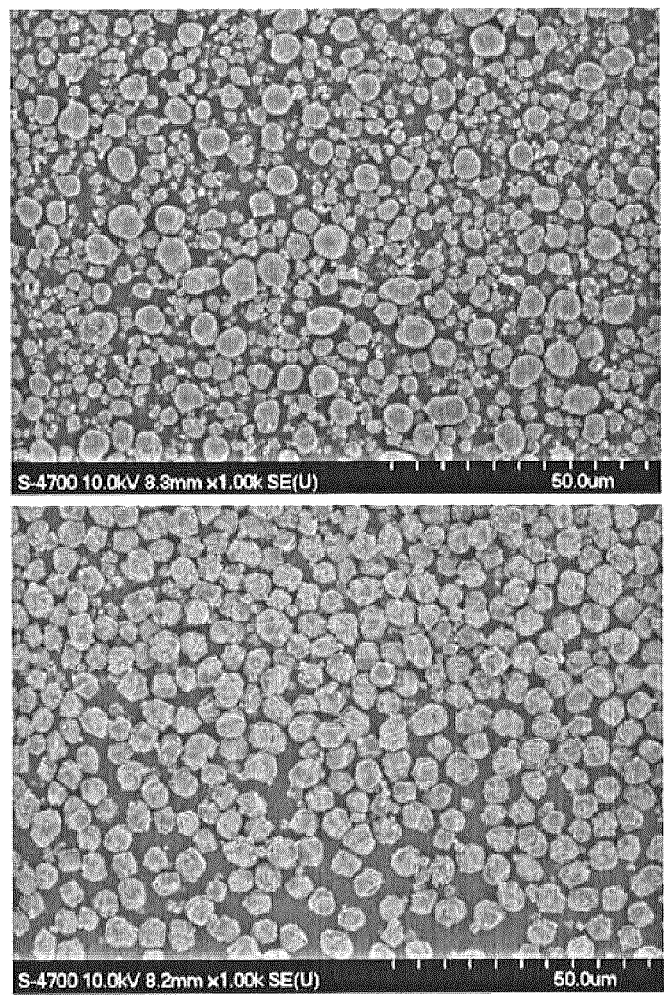
FIG. 20 provides scanning electron microscope micrographs of particles produced with and without excess reagent.

In one instance, 2 M $NH_4HCO_3$, was used with 1 M $MnSO_4$ in a 50 mL reaction chamber subjected to ultrasonic irradiation at 80% of full amplitude (about 1.9 W/mL). Excess $NH_4HCO_3$ was observed. A wide size distribution was observed. The tap density observed was 1.85 g/mL. The upper portion of FIG. 20 provides an SEM micrograph showing the resulting $MnCO_3$ particles with a wide size distribution. By way of comparison, in another instance, 0.6 M $NH_4HCO_3$ was used with 0.5 M $MnSO_4$ in a 300 mL reaction chamber subjected to ultrasonic irradiation at 80% of full amplitude (about 0.32 W/mL). No excess was observed, and a narrow size distribution was achieved. The tap density in this instance was 1.70 g/mL. The lower portion of FIG. 20 provides a SEM micrograph showing the resulting $MnCO_3$ particles with a narrow size distribution. These instances illustrate that it is undesirable to provide reagents in excess because of the resulting wide size distribution.

In another instance, 0.6 M $NH_4HCO_3$ and 0.5 M $MnSO_4$ were used in a reaction that started with water. In this case, reagents were used in roughly equivalent amounts, and no excess was observed. The resulting particles had a narrow size distribution and a tap density of 1.70 g/mL. By way of contrast, instead of starting with water, the reaction started with 0.5 M $(NH_4)_2SO_4$ (a by-product of the reaction). In this instance, although no excess was observed, a wide size distribution was observed and the tap density was 1.87 g/mL. For both experiments, a 300 mL reaction chamber was used and was subjected to ultrasonic irradiation at 80% of full amplitude (about 0.32 W/mL). This example suggests a high amount of $(NH_4)_2SO_4$ is also undesirable in achieving a narrow size distribution.

Figure 21:
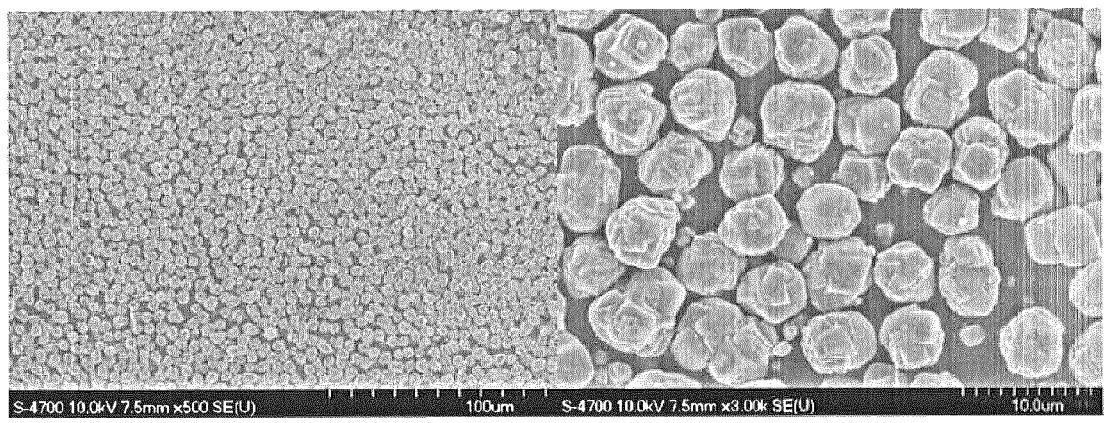
FIG. 21 illustrates exemplary particles obtained with a SEM micrograph showing both a lower magnification (left) and a higher magnification (right).

In a further instance, a tap density of 2.05 g/mL for $MnCO_3$ was achieved with a desirable narrow size distribution. In this instance, 1 M $MnSO_4$ was used with 1.08 M $Na_2CO_3$. The 700 mL reaction chamber was subjected to ultrasonic irradiation at 100% amplitude (about 0.17 W/mL). The conditions of this example included 80% amplitude of the sonicator and flow rates of 5 mL/min for each reactant. The reaction proceeded at 65° C., with no pH control. In this instance, $MnCO_3$ particles were achieved with the highly desirable tap density, a decent particle size, and a narrow size distribution. FIG. 21 illustrates the particles obtained in this instance. An SEM micrograph showing the resulting $MnCO_3$ particles at a lower magnification (left) as well as a higher magnification (right) is provided to indicate good particle size and narrow size distribution.

Advantageously, the production of particles is fast and efficient due to a residence time in the reaction chamber on the order of a few minutes. The production of particles can be conducted using very high reactant concentrations of 1 to 2 M. Further, no pH monitoring is required in the method described, nor are other additional chemicals such as surfactants required. The high yield produced in this instance is fast and results in less waste, potentially increasing efficiencies and reducing cost.

Particles with a narrow size distribution can be obtained using the arrangement and method described. For a small reaction chamber, small particles and a wide size distribution may result, possibly due to inadequate mixing of reagents before reacting. Thus, by increasing the volume to be greater than 300 mL, which can scale up to 700 mL or volumes greater than 25 L with appropriate equipment, intimate mixing within the reaction chamber is possible, producing particles that are larger and more uniform in size.

In additional examples and conditions tested, it was found that by varying the amplitude of the probe from 0% to 100% in 20% increments in a reaction of 1 M $MnSO_4$ and 1 M $NH_4HCO_3$ (at a flow rate of 5 mL/min), the tap density increases steadily. In general, high amplitudes (or high sonication intensity (high W/mL)), lead to more spherical particles. Particles move more from irregular shapes to quasi-spherical and spherical shapes at about the 50% amplitude range (about 60 W output power in an aqueous medium using Branson Sonifier™ 450A with flat probe tip of diameter 1.2 cm), which corresponds to about 1.2 W/mL when using a continuous reactor volume of about 50 mL.

When flow rates are adjusted using the same reactants at 100% amplitude in a 700 mL continuous reactor, flow rates of 10 mL/min and below give desirable tap densities. Larger flow rates are preferred for higher throughput. Larger flow rates may be used with larger reaction volumes (with appropriate sonication power).

Particles according to the present disclosure may be obtained by flowing, for example, approximately 1 M $MnSO_4$ and approximately 1 M $Na_2CO_3$ each at a flow rate of, for example, 50 mL/min, into a well mixed reaction chamber of volume, for example, 1 L. A chelating agent, such as 0.1 M $(NH_4)_2SO_4$ may be added with the $MnSO_4$. Ultrasonic irradiation is delivered to the contents of the reaction volume such that the irradiation is substantially uniform throughout the volume and the power density that is delivered is greater than, for example, 1 W/mL. In some examples, the power density may be approximately 3 W/mL. The ultrasonic source may be two or more ultrasonic transducers attached to the external surface of the reaction chamber so that the source of irradiation is spread over the ends of a cylindrical reaction chamber or over the entire surface of the reaction chamber. Preferably, the two inlet ports may be spaced as far apart as the reaction chamber will allow, placing the outlet port so that it is substantially equidistant from both inlet ports.

In reaction chambers that use a localized source (non-uniform) of ultrasonic irradiation, such as an ultrasonic probe tip it may be desirable to space the two inlet ports as far apart as the reaction chamber will allow, placing the outlet port so that it is equidistant from both inlet ports.

For a narrow size distribution, separating the reagent entry ports is desirable. Separating the reagent entry ports allows the reagents to be diluted and well mixed with the contents of the reaction chamber before precipitation occurs.

Production of $MnCO_3$ Particles

Figure 22:
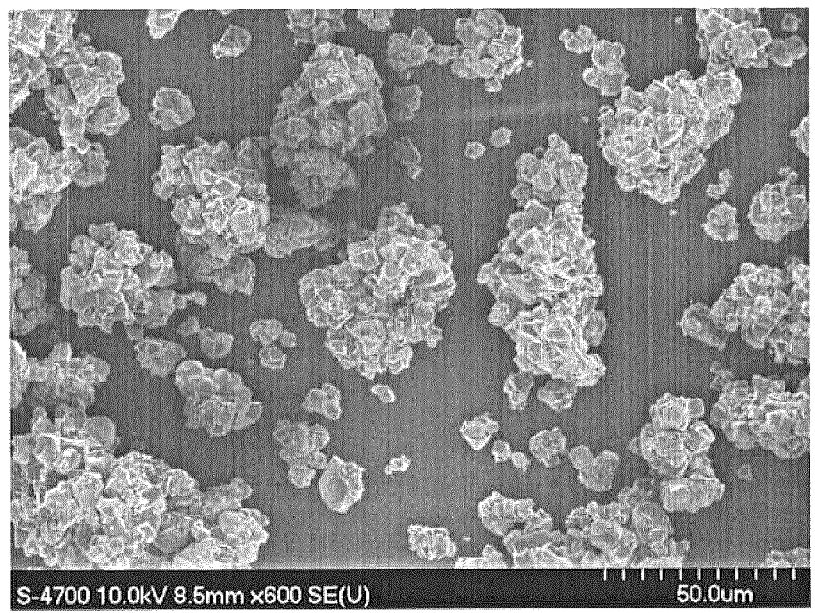
FIG. 22 is a scanning electron microscope micrograph of manganese carbonate particles produced in a continuous reactor with no ultrasonic irradiation.

FIG. 22 shows $MnCO_3$ particles produced in a 700 mL continuous reactor at 70° C. under stirring using 1 M $MnSO_4$ and 1.5 M $Na_2CO_3$ each fed at 5 mL/min. The produced particles have a tap density of 1.47 g/mL (or about 40% of the crystal bulk density).

Figure 23:
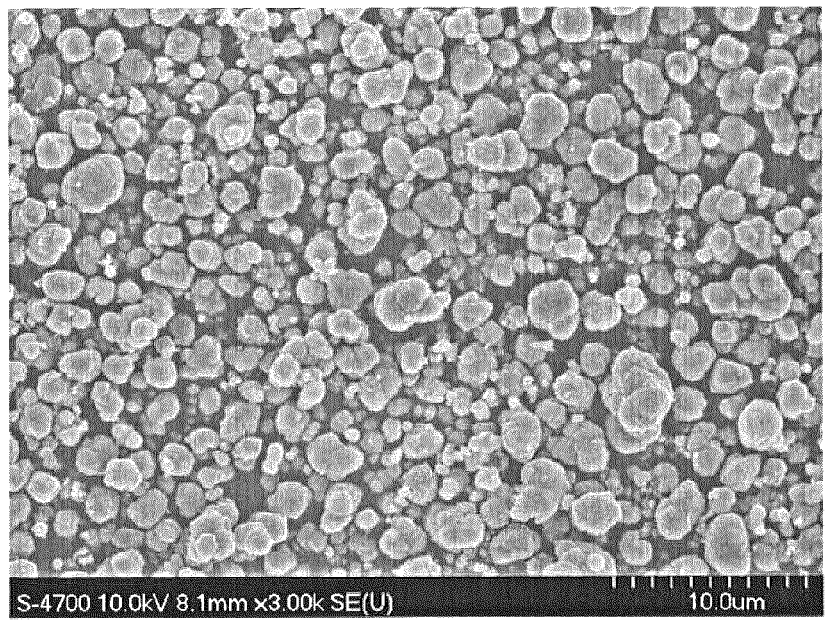
FIG. 23 is a scanning electron microscope micrograph of manganese carbonate particles produced in a continuous reactor, according to an aspect of the present application.

FIG. 23 shows $MnCO_3$ particles produced in a 700 mL continuous reactor at 70° C. under sonication (Branson 450A; 20 kHz, 400 W, 10%-100% amplitude control) at 100% amplitude (about 0.17 W/mL) by the reaction of 1 M $MnSO_4$ and 1.5 M $Na_2CO_3$ each fed at 5 mL/min. The produced particles have a tap density of 1.65 g/mL (or about 45% of the crystal bulk density). No sonication during the reaction results in large agglomerated particles (as illustrated in FIG. 22), while sonication during the reaction results in smaller, less agglomerated particles (FIG. 23).

Figure 24:
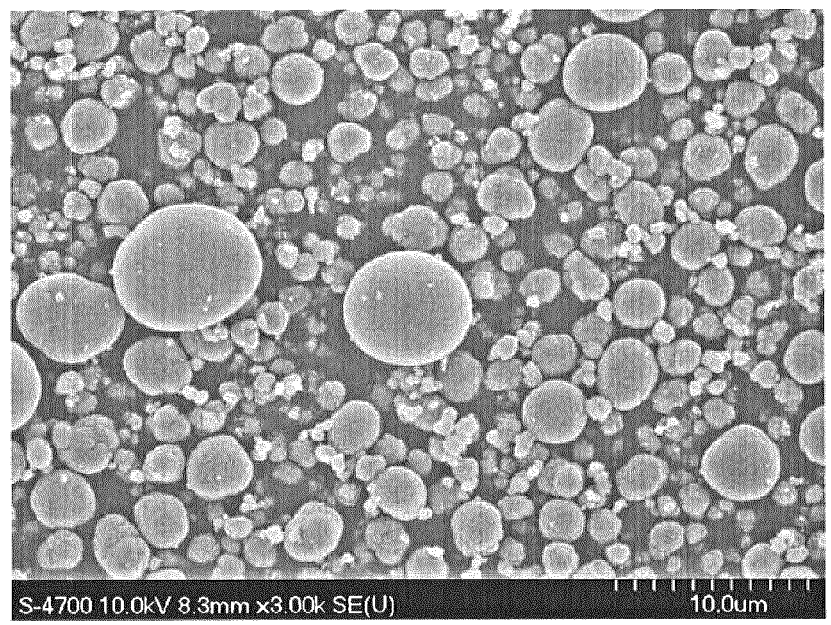
FIG. 24 is a scanning electron microscope micrograph of manganese carbonate particles produced in a continuous reactor, according to an aspect of the present application.

FIG. 24 shows $MnCO_3$ particles generated using a continuous reactor under the same conditions as that of FIG. 7, except that the temperature of the reactor was 70° C. and the reactor had two entry ports positioned to direct the two reagent solution towards the probe head. The produced particles have a tap density of 1.79 g/mL (or about 48% of the crystal bulk density).

Figure 25:
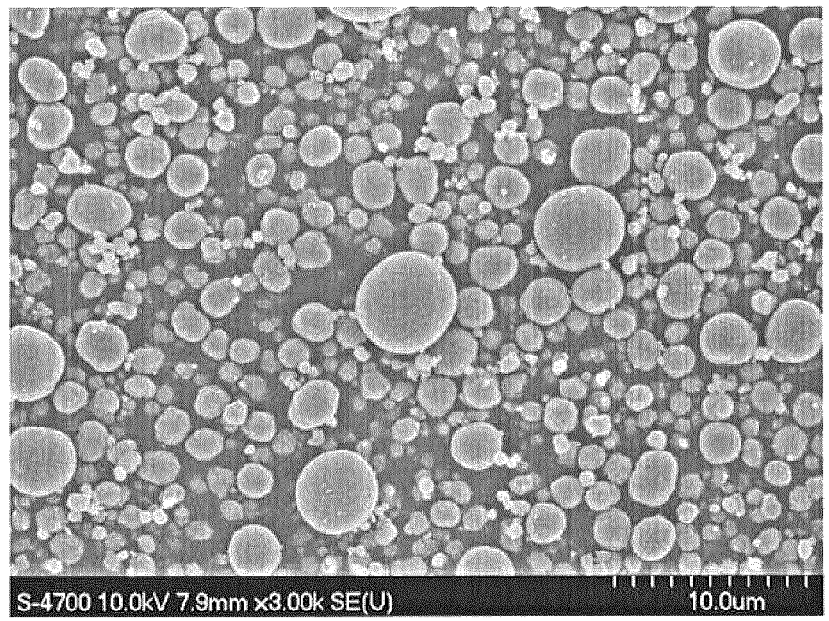
FIG. 25 is a scanning electron microscope micrograph of manganese carbonate particles produced in a continuous reactor, according to an aspect of the present application.

FIG. 25 shows $MnCO_3$ particles generated using the same conditions as that of FIG. 24, except $Na_2CO_3$ was used instead of $NH_4HCO_3$. The produced particles have a tap density of 1.74 g/mL (or about 47% of the crystal bulk density).

Figure 26:
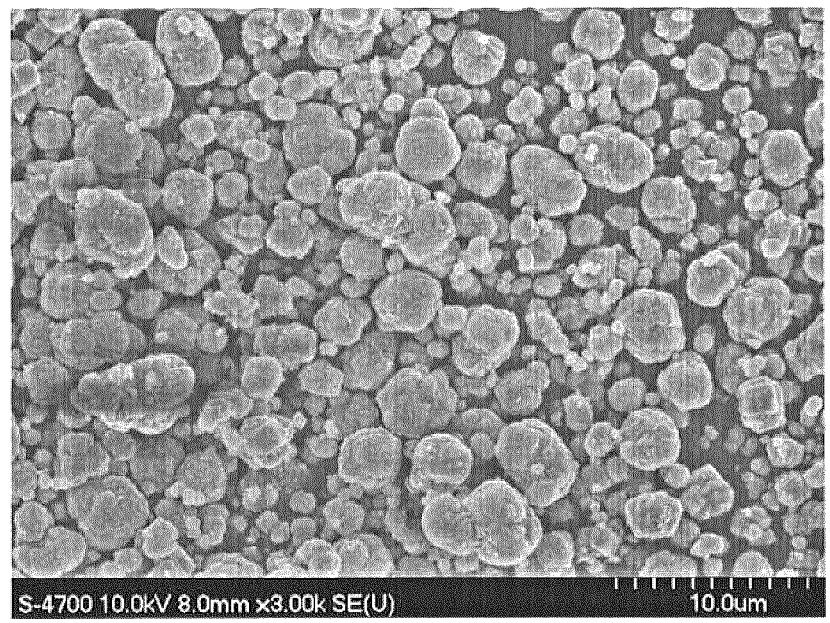
FIG. 26 is a scanning electron microscope micrograph of manganese carbonate particles produced in a continuous reactor, according to an aspect of the present application.

FIG. 26 shows $MnCO_3$ particles produced in a 700 mL continuous reactor at 70° C. under sonication at 100% amplitude (or about 0.17 W/mL) when feeding 1 M $Na_2CO_3$ and 1.5 M $MnSO_4$ at 5 mL/min. The resulting particles have a tap density of 1.73 g/mL. A wide size distribution was observed.

Figure 27:
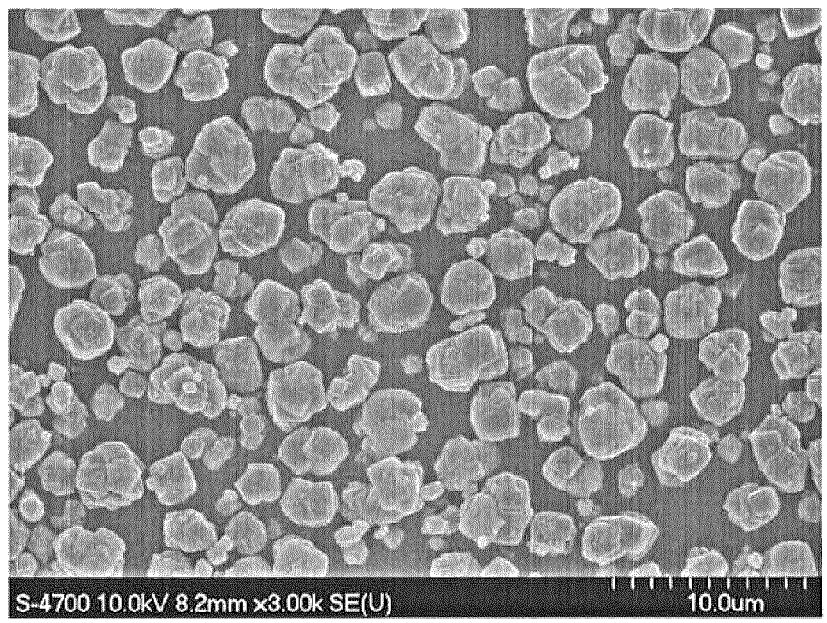
FIG. 27 is a scanning electron microscope micrograph of manganese carbonate particles produced in a continuous reactor, according to an aspect of the present application.

By way of comparison, FIG. 27 shows $MnCO_3$ particles produced when 1.05 M $Na_2CO_3$ was used with 1 M $MnSO_4$ under the same conditions as the particles seen in FIG. 26. The resulting particles have a tap density of 1.94 g/mL. No excess was observed, and a narrower size distribution of larger particles was achieved.

Figure 28:
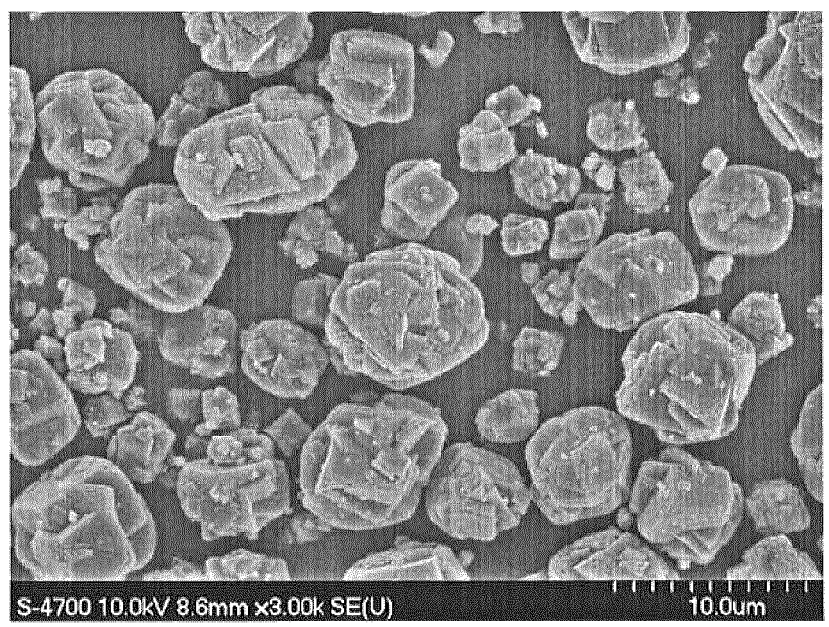
FIG. 28 is a scanning electron micrograph of manganese carbonate particles produced in a continuous reactor, according to an aspect of the present application.

FIG. 28 shows $MnCO_3$ particles produced when 0.7 M $NH_4HCO_3$ and 0.5 M $MnSO_4$ were each added at 5 mL/min to a 300 mL continuous reactor kept at 70° C. that was initially charged with 0.5 M $(NH_4)_2SO_4$ (a by-product of the reaction) (instead of distilled water), and where the reagents were reacted under sonication at 80% amplitude (or about 0.32 W/mL). The resulting particles have a tap density of 1.87 g/mL. Although no excess was observed, a wide size distribution was observed. This example suggests that a high amount of $(NH_4)_2SO_4$ is undesirable in achieving a narrow size distribution. However, the $MnCO_3$ particles were relatively large. This suggests that a high amount of $(NH_4)_2SO_4$ is desirable in obtaining large particles and, further, that varying amounts of $(NH_4)_2SO_4$ could allow for particle size control.

Figure 29:
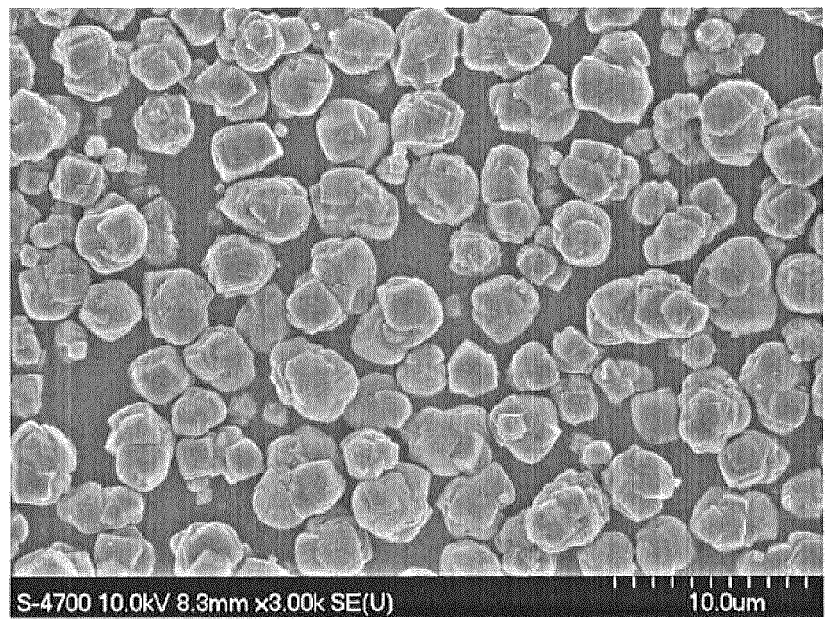
FIG. 29 is a scanning electron microscope micrograph of manganese carbonate particles produced in a continuous reactor, according to an aspect of the present application.

FIG. 29 shows MnCO$_3$ particles produced when a mixture of 1 M MnSO$_4$ with 0.05 M (NH$_4$)$_2$SO$_4$ was added with 1.05 M Na$_2$CO$_3$, each at 5 mL/min, to a 700 mL continuous reactor kept at 70° C. and reacted under sonication at 100% amplitude (or about 0.17 W/mL). The resulting particles have a tap density of 2.02 g/mL.

Figure 30:
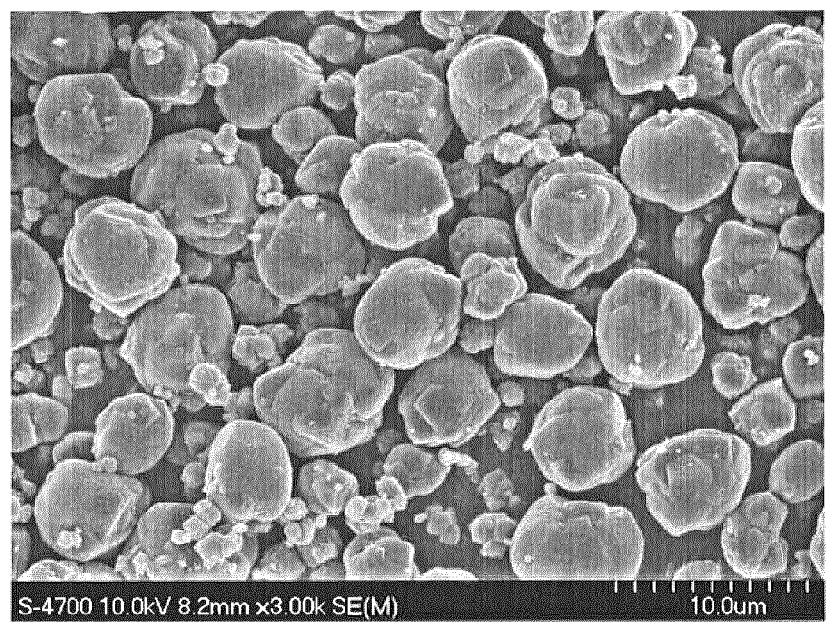
FIG. 30 is a scanning electron microscope micrograph of manganese carbonate particles produced in a continuous reactor, according to an aspect of the present application.

FIG. 30 shows MnCO$_3$ particles produced when a mixture of 1 M MnSO$_4$ with 0.03 M (NH$_4$)$_2$SO$_4$ was added with 1.08 M Na$_2$CO$_3$, each at 5 mL/min, to a 700 mL continuous reactor kept at 70° C. and reacted under sonication at 100% amplitude (or about 0.17 W/mL). The resulting particles have a tap density of 2.11 g/mL. The particles illustrated in FIGS. 30 and 31 suggest that a small amount of (NH$_4$)$_2$SO$_4$ is desirable in achieving relatively large particles with a more uniform size distribution.

Figure 31:
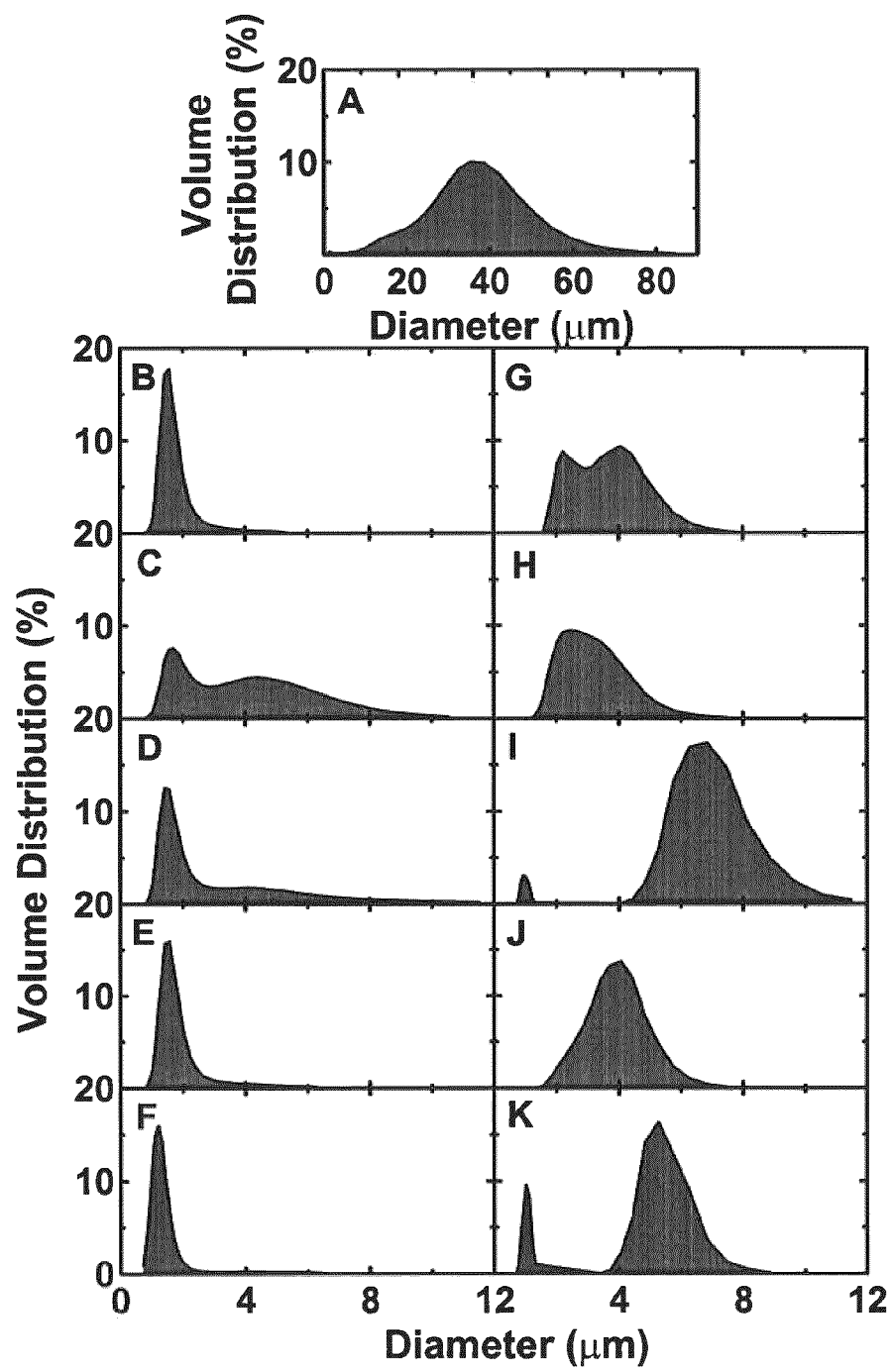
FIG. 31 illustrates the particle size distribution plots for the samples illustrated in FIGS. 17 and 22-31 where panel A illustrates the particle size distribution of the sample shown in FIG. 22, panel B illustrates the particle size distribution of the sample shown in FIG. 23, panel C illustrates the particle size distribution of the sample shown in FIG. 7, panel D illustrates the particle size distribution of the sample shown in FIG. 24, panel E illustrates the particle size distribution of the sample shown in FIG. 25, panel F illustrates the particle size distribution of the sample shown in FIG. 17, panel G illustrates the particle size distribution of the sample shown in FIG. 26, panel H illustrates the particle size distribution of the sample shown in FIG. 27, panel I illustrates the particle size distribution of the sample shown in FIG. 28, panel J illustrates the particle size distribution of the sample shown in FIG. 29, and panel K illustrates the particle size distribution of the sample shown in FIG. 30.

FIG. 31 illustrates particle size distribution plots for samples shown within the present application. Panel A illustrates the particle size distribution of the sample shown in FIG. 22, panel B illustrates the particle size distribution of the sample shown in FIG. 23, panel C illustrates the particle size distribution of the sample shown in FIG. 7, panel D illustrates the particle size distribution of the sample shown in FIG. 24, panel E illustrates the particle size distribution of the sample shown in FIG. 25, panel F illustrates the particle size distribution of the sample shown in FIG. 17, panel G illustrates the particle size distribution of the sample shown in FIG. 26, panel H illustrates the particle size distribution of the sample shown in FIG. 27, panel I illustrates the particle size distribution of the sample shown in FIG. 28, panel J illustrates the particle size distribution of the sample shown in FIG. 29, and panel K illustrates the particle size distribution of the sample shown in FIG. 30.

In the preceding description, for purposes of explanation, numerous details are set forth in order to provide a thorough understanding of the embodiments. However, it will be apparent to one skilled in the art that these specific details are not required.

The above-described embodiments are intended to be examples only. Alterations, modifications and variations can be effected to the particular embodiments by those of skill in the art without departing from the scope, which is defined solely by the claims appended hereto.

All documents and citations mentioned herein are incorporated by reference.

The invention claimed is:

1. A method of preparing insoluble metal compound particles in a reaction chamber, said particles represented by the formula (TM)(S'), the method comprising:
   providing a metal salt solution at a concentration greater than 0.1 M, the metal salt having the formula (TM)(S) and comprising a metal component (TM) that comprises one or more metals independently selected from the group consisting of Mn, Co, Mg, Zn, Ca, Sr, Cu, Zr, Fe, Al, Ga, In, Cr, Ge and Sn;
   providing source of an anionic compound at a concentration greater than 0.1 M, the anionic compound being a carbonate-, hydroxide-, phosphate-, oxyhydroxide- or oxide-based compound, said anionic compound comprising an anionic component represented by S', wherein said anionic component is reactive with the metal component TM to form the insoluble metal compound particles;
   adding the metal salt solution and the anionic compound to a reaction chamber; and
   subjecting the reaction chamber to sonication at an ultrasonic power density of from about 0.1 to about 50 W/mL to form the insoluble metal compound particles.

2. The method according to claim 1, wherein the power density is from about 1 W/mL to about 5 W/mL.

3. The method according to claim 1, wherein the metal salt solution comprises MnSO$_4$, Mn(CH$_3$COO)$_2$, MnCl$_2$, Mn(NO$_3$)$_2$, (Ni$_{1/3}$Mn$_{1/3}$Co$_{1/3}$)SO$_4$, or (Ni$_{1/3}$Mn$_{1/3}$Co$_{1/3}$)(NO$_3$)$_2$.

4. The method according to claim 1, wherein the source of the anionic compound is a solution comprising Na$_2$CO$_3$, NH$_4$HCO$_3$, (NH$_4$)$_2$CO$_3$, NH$_4$OH, NaHCO$_3$, NaOH, KHCO$_3$, K$_2$CO$_3$, KOH, H$_3$PO$_4$, NaH$_2$PO$_4$, Na$_2$HPO$_4$, (NH$_4$)$_3$PO$_4$, (NH$_4$)$_2$HPO$_4$, (NH$_4$)H$_2$PO$_4$, (NH$_4$)$_2$NaPO$_4$, (NH$_4$)Na$_2$PO$_4$, KH$_2$PO$_4$, K$_2$HPO$_4$, (NH$_4$)$_2$KPO$_4$, (NH$_4$)K$_2$PO$_4$, or KMnO$_4$.

5. The method according to claim 4, wherein the source of the anionic compound is a solution comprising Na$_2$CO$_3$ and/or NH$_4$HCO$_3$.

6. The method according to claim 1, wherein the ratio of the anionic compound to the metal salt in the reaction chamber is from about 1:1.5 to about 1.5:1.

7. The method according to claim 1, wherein sonication is provided by a probe tip, by vibrating diaphragms, or by any number of ultrasonic transducers attached to reaction chamber walls.

8. The method according to claim 1, wherein the reaction chamber comprises a flow-through chamber.

9. The method according to claim 1, wherein the insoluble metal compound particles are spherical, quasi-spherical or irregular in shape.

10. The method according to claim 1, wherein the insoluble metal compound particles produced have a particle size distribution of at least 90% of particles within 1 μm and 50 μm.

11. The method according to claim 1, wherein the insoluble metal compound particles produced comprise MnCO$_3$ having a tap density from about 1.5 g/mL to about 3.0 g/mL.

12. The method according to claim 1, wherein the insoluble metal compound particles produced have a tap density from about 1.7 g/mL to about 2.3 g/mL.

13. The method according to claim 1, wherein the metal salt solution comprises MnSO$_4$, the source of the anionic compound is a solution comprising Na$_2$CO$_3$ and/or NH$_4$HCO$_3$, the ratio of MnSO$_4$ to Na$_2$CO$_3$ and/or NH$_4$HCO$_3$ is from about 1:1.5 to about 1.5:1, and particles comprise MnCO$_3$ with a tap density of from about 1.7 g/mL to 2.3 g/mL.

14. The method according to claim 1, wherein the volume of the reaction chamber is 300 mL or greater.

15. The method according claim 14, wherein the metal salt solution and the anionic compound are added to a reaction chamber via reagent entry ports positioned more than about 10 cm apart from each other.

16. The method according to claim 1, wherein the residence time in the reaction chamber is from about 1 second to about 60 minutes.

17. The method according to claim 1, further comprising adding a chelating agent to the reaction chamber.

18. The method according to claim 17, wherein the chelating agent is ammonium sulfate, ammonium hydroxide, ammonium chloride, ammonium acetate, ammonium nitrate, urea, or any mixture thereof.

19. The method according to claim 1, wherein the reaction chamber is at a temperature of from about −20° C. to about 100° C.

20. The method according to claim 1, wherein:
   the metal salt solution is at a concentration from about 0.1 M to about 5 M; and
   the anionic compound solution is at a concentration from about 0.1 M to about 5 M.

21. The method according to claim 1, wherein the power density is about 3 W/mL.

22. The method according to claim 1, wherein the ratio of the anionic compound to the metal salt in the reaction chamber is from about 1:1.

23. The method according to claim 1, wherein the insoluble metal compound particles produced have a particle size distribution of at least 90% of particles within 1 μm and 30 μm.

24. The method according to claim 1, wherein the insoluble metal compound particles produced have a particle size distribution of at least 90% of particles within 1 μm and 20 μm.

25. The method according to claim 1, wherein the insoluble metal compound particles produced have a particle size distribution of at least 90% of particles within 3 μm and 10μm.

26. The method according to claim 1, wherein the residence time in the reaction chamber is from about 5 second to about 30 minutes.

27. The method according to claim 1, wherein the residence time in the reaction chamber is from about 10 second to about 5 minutes.

28. The method according to claim 1, wherein the reaction chamber is at a temperature of from about 0° C. to about 100° C.

29. The method according to claim 1, wherein the reaction chamber is at a temperature of from about 30° C. to about 100° C.

30. The method according to claim 1, wherein the reaction chamber is at a temperature of from about 50° C. to about 100° C.

31. The method according to claim 1, wherein:
the metal salt solution is at a concentration from about 0.5 M to about 3 M; and
the anionic compound solution is at a concentration from about 0.5 M to about 3 M.

32. The method according to claim 1, wherein:
the metal salt solution is at a concentration from about 1 M to about 2 M; and
the anionic compound solution is at a concentration from about 1 M to about 2 M.

33. The method according to claim 1, wherein the metal component of the metal salt comprises Mn, Co, or Fe.

34. The method according to claim 33, wherein the metal salt solution comprises $MnSO_4$, $Mn(CH_3COO)_2$, $MnCl_2$, $Mn(NO_3)_2$, $(Ni_{1/3}Mn_{1/3}Co_{1/3})SO_4$, or $(Ni_{1/3}Mn_{1/3}Co_{1/3})(NO_3)_2$.

* * * * *